United States Patent
Ertle et al.

(10) Patent No.: US 12,254,688 B2
(45) Date of Patent: *Mar. 18, 2025

(54) IMAGE RECOGNITION SYSTEM

(71) Applicant: NIKE, Inc., Beaverton, OR (US)

(72) Inventors: Jason Lee Ertle, Portland, OR (US);
Kevin L. Hofstee, Portland, OR (US);
Shane K. Luke, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,204

(22) Filed: Oct. 3, 2023

(65) Prior Publication Data

US 2024/0029425 A1 Jan. 25, 2024

Related U.S. Application Data

(63) Continuation of application No. 17/401,814, filed on Aug. 13, 2021, now Pat. No. 11,810,344, which is a (Continued)

(51) Int. Cl.
| | |
|---|---|
| *G06T 7/73* | (2017.01) |
| *G06F 18/2413* | (2023.01) |
| *G06V 10/28* | (2022.01) |
| *G06V 10/44* | (2022.01) |
| *G06V 10/764* | (2022.01) |

(Continued)

(52) U.S. Cl.
CPC ......... *G06V 20/10* (2022.01); *G06F 18/2413* (2023.01); *G06T 7/74* (2017.01); *G06V 10/28* (2022.01); *G06V 10/44* (2022.01); *G06V 10/764* (2022.01); *G06F 18/24323* (2023.01);
*G06T 2200/24* (2013.01); *G06V 10/141* (2022.01); *G06V 10/143* (2022.01); *G06V 2201/09* (2022.01)

(58) Field of Classification Search
CPC .......... G06T 7/2006; G06T 5/50; G06T 3/40; G06T 7/74; G06T 2200/24; G06T 7/194; H04N 5/23293; H04N 13/0456; H04N 13/0242; G06F 17/241; G06F 17/211
See application file for complete search history.

(56) References Cited

U.S. PATENT DOCUMENTS

| | | |
|---|---|---|
| 9,037,600 B1 | 5/2015 | Garrigues et al. |
| 9,224,070 B1 | 12/2015 | Sundareswara et al. |

(Continued)

FOREIGN PATENT DOCUMENTS

| | | |
|---|---|---|
| EP | 3218076 A1 | 9/2017 |
| JP | 2008205774 A | 9/2008 |
| WO | 2016123538 A1 | 8/2016 |

OTHER PUBLICATIONS

Apr. 4, 2019—(WO) ISR & WO—App. No. PCT/US18/057370.
Jan. 19, 2023—(CN) Office Action—App. No. 201880081419.0.

*Primary Examiner* — Phuoc H Doan
(74) *Attorney, Agent, or Firm* — Banner & Witcoff, Ltd.

(57) ABSTRACT

Systems and methods for predicting items within content and using improved, fine-grained image classification techniques to produce images used to identify consumer products in the real-world by allowing for the recognition of a product using an image captured under a variety of conditions and environments, such as angles, lighting, camera settings, and the like.

22 Claims, 14 Drawing Sheets

Related U.S. Application Data continuation of application No. 16/169,774, filed on Oct. 24, 2018, now Pat. No. 11,127,157.

(60) Provisional application No. 62/576,250, filed on Oct. 24, 2017.

(51) Int. Cl.
*G06V 20/10* (2022.01)
*G06F 18/243* (2023.01)
*G06V 10/141* (2022.01)
*G06V 10/143* (2022.01)

(56) References Cited

U.S. PATENT DOCUMENTS

| | | |
|---|---|---|
| 9,424,461 B1 | 8/2016 | Yuan et al. |
| 9,652,838 B1 | 5/2017 | Manmatha et al. |
| 10,176,550 B1 | 1/2019 | Baggerman |
| 2010/0260426 A1* | 10/2010 | Huang ................. G06F 18/217 707/E17.031 |
| 2010/0313117 A1 | 12/2010 | Fukasawa |
| 2015/0169994 A1 | 6/2015 | Chinen et al. |
| 2015/0189188 A1 | 7/2015 | Penov et al. |
| 2016/0307028 A1 | 10/2016 | Fedorov |
| 2016/0335745 A1* | 11/2016 | Tajima ..................... G06T 5/00 |
| 2017/0061197 A1 | 3/2017 | Brain |
| 2017/0256040 A1 | 9/2017 | Grauer |

* cited by examiner

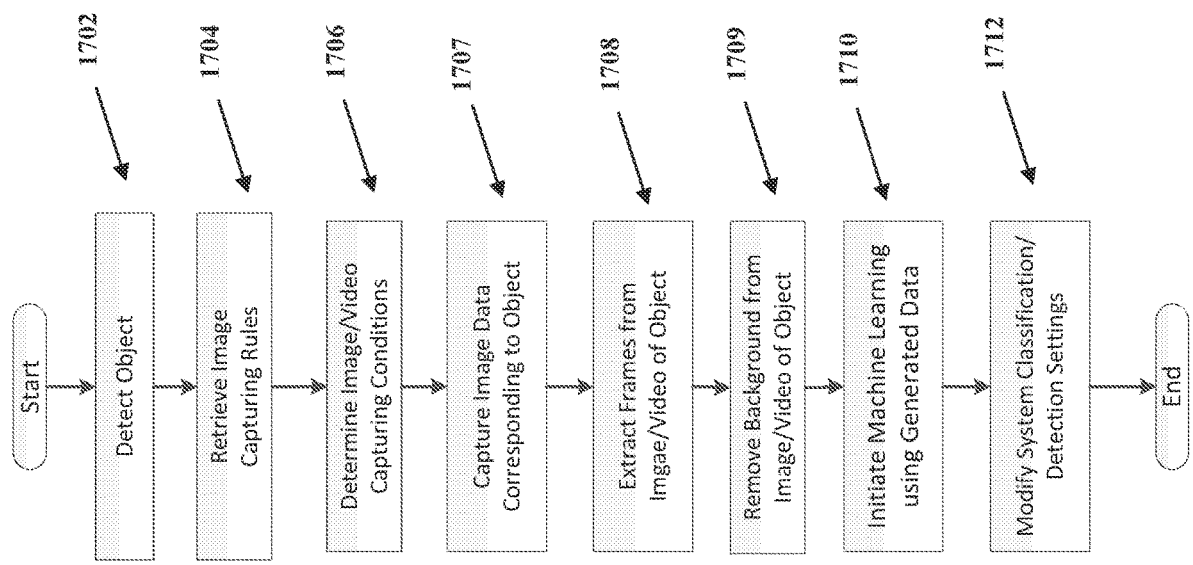

IMAGE RECOGNITION SYSTEM

CROSS-REFERENCE TO RELATED APPLICATIONS

This application is a continuation of U.S. patent application Ser. No. 17/401,814 filed Aug. 13, 2021, which is a continuation of U.S. patent application Ser. No. 16/169,774 filed Oct. 24, 2018, now U.S. Pat. No. 11,127,157 dated Sep. 21, 2021, which claims the benefit of and priority to U.S. Provisional Patent Application No. 62/576,250, entitled "IMAGE RECOGNITION SYSTEM," filed Oct. 24, 2017, which are expressly incorporated herein by reference in their entireties for any and all non-limiting purposes.

FIELD OF THE INVENTION

The technologies disclosed relate to systems and methods used to identify and recognize objects. More particularly, the technologies disclosed relate to systems and methods for confidently predicting items within content by leveraging machine learning protocols and algorithms.

BACKGROUND

Certain image classification systems are limited in terms of the type of input used to train and calibrate the detection system, and further, the system's ability to accurately detect objects captured in a variety of environments and conditions. Indeed, with the increased use of mobile devices to capture content, classification systems conventionally rely on images captured in conditions that are too uniform in nature—for the purpose of creating high quality images. However, even with enhanced capture ability, the search space (e.g., abstract vector or tensor field parameters representing pixel values in an image) may become too dense, thereby making accurate and fine-grained image classification virtually impossible using conventional image recognition techniques. Performing fine-grained classifications can raise challenges when attempting to develop an efficient learning/generalization scheme due to the inevitable dearth of labeled or categorized examples as the grain becomes very fine.

In order to efficiently capture data of an object in as many scenarios and conditions—be they angle of view, lighting, brightness, focus or motion blur, and the like—with the lowest amount of capture events possible requires a specialized system and process in order to minimize the repetitive, time-insensitive and costly nature of data capture. Thus, there is a need for an improved image recognition system that is capable of efficiently obtaining image data to be used as training and verification data for machine learning techniques such that the system may detect objects within image data with a certain level of confidence. Accordingly, aspects of the present disclosure are directed toward solving this challenge by building a learning system that generalizes well in unexplored spaces, and is capable of understanding enough of a base class of a product to efficiently identify differences that separate fine classes for that product.

BRIEF DESCRIPTION OF THE DRAWINGS

FIG. 14 shows a method to capture image data in accordance with example embodiments.

DETAILED DESCRIPTION

Aspects of innovations disclosed herein further relate to systems and methods for confidently predicting items within content by leveraging machine learning protocols and algorithms. Using improved fine-grained image classification techniques, the classification system described herein may distinguish between objections within a shared base class as well as subordinate categories of some base-classes.

In other aspects of the present disclosure, the classification system disclosed herein aims to produce images used to identify consumer products in the real-world by allowing for the recognition of a product using an image captured under a variety of conditions and environments, such as angles, lighting, camera settings, and the like. Moreover, the classification system counter-intuitively create as much variation as possible when capturing image data (potentially used as verification data) in an attempt to mimic the types of shots that may be captured and submitted by consumers. The classification system may utilize the verification data to calibrate the detection and classification of particular products. In some aspects of the present disclosure, the classification system may utilize an application interface that allows the user to capture and submit image data for classification.

Some aspects of the present disclosure may also relate to aspects of systems and methods for receiving a request for an electronic document comprising content, retrieving the electronic document associated with the request, processing the electronic document to identify an inventory tag that identifies an item in the content, obtaining availability information of the item associated with the inventory tag, updating the electronic document to include the availability information, and transmitting the electronic document including the availability information. Further aspects of the present disclosure may relate to systems and methods for receiving content for presentation in an electronic document, receiving an inventory tag identifying an item included in the content, the inventory tag being associated with a posting user identifier, receiving a purchase request for the item, the purchase request comprising the posting user identifier, and updating incentive information associated with the posting user identifier.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example User System

A. Illustrative Networks

Figure 1:
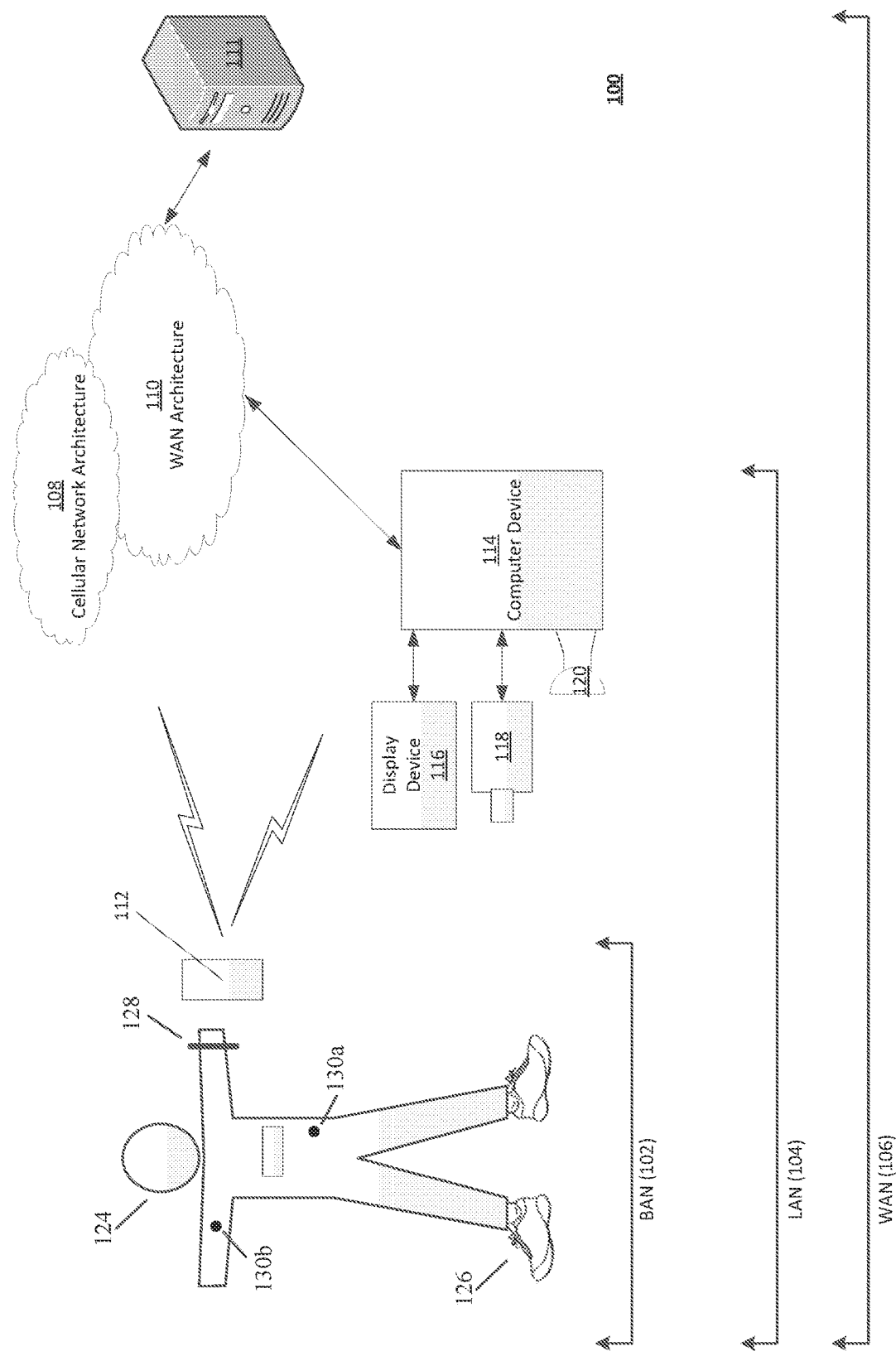
FIG. 1 illustrates an example system that may be configured to provide a user with the ability to capture and transmit image data in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a user communication system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
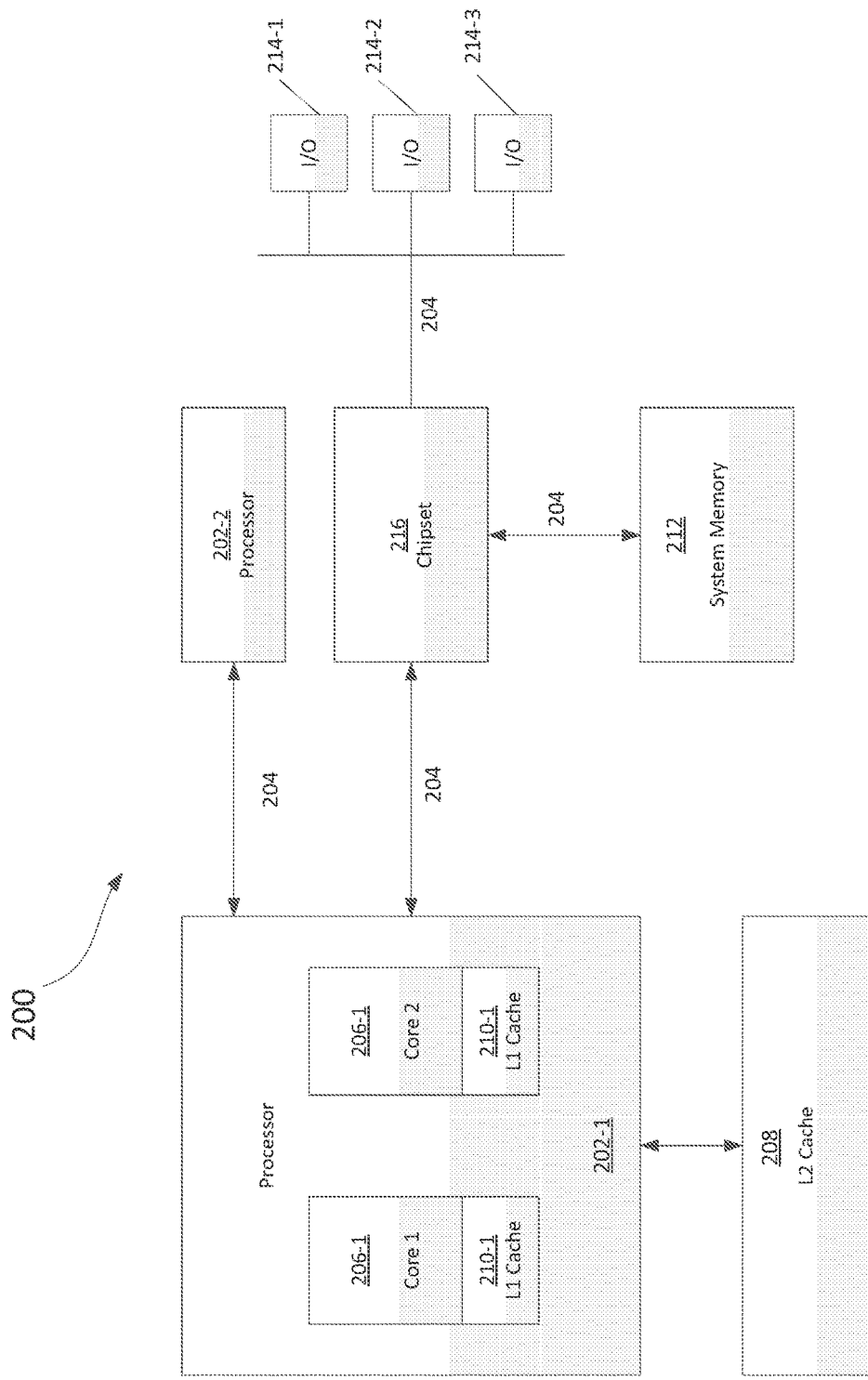
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to activity data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from user 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

System 100 may be configured to transmit and/or receive data, including image data captured by an image capturing device within portable device 112 (and/or a stand-alone image capturing device such as a camera) collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise image data, such as raw or processed data collected within system 100. System 100 may be configured to transmit data, such as images and/or video, to a social networking website or host such a site. Server 111 may be utilized to permit one or more users to access image data obtained by one or more users. As such, server 111 may be configured to transmit and/or receive notifications based upon image data or other information.

Returning to LAN 104, computer device 114 is shown in operative communication with a display device 116, an image-capturing device 118, sensor 120, which are discussed in turn below with reference to example embodiments. In one embodiment, display device 116 may provide audio-visual cues to user 124 to capture images of a particular object. The audio-visual cues may be provided in response to computer-executable instruction executed on computer device 114 or any other device, including a device of BAN 102 and/or WAN. Display device 116 may be a touchscreen device or otherwise configured to receive a user-input.

In some aspects of the present disclosure, image data may be obtained from image-capturing device 118 (and/or portable device 112), which may be used to detect items within the image data (and/or to train the system to detect items within image data). Image-capturing device 118 may comprise a transceiver device. In one embodiment image-capturing device 118, may transmit waveforms into the environment, including towards the direction of user 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 may detect waveforms emitted from external sources (e.g., not system 100). For example, devices 118 may detect heat being emitted from user 124 and/or the surrounding environment. Thus, image-capturing device 126 may comprise one or more thermal imaging devices. In one embodiment, image-capturing device 126 may comprise an IR device configured to perform range phenomenology.

BAN 102 may include two or more devices configured to receive, transmit, or otherwise facilitate the collection of image data (including passive devices). Exemplary devices may include one or more data acquisition units, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the user's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128. One or more devices 112, 126, 128, may be specially designed for image capturing purposes. Indeed, aspects of this disclosure relate to utilizing data from one or more devices to collect and detect image data, and in some instances athletic data. In certain embodiments, one or more devices of BAN 102 (or any other network) may comprise an image capturing device that is specifically designed for a capturing particular types of image data.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, California or Zune® or Microsoft® Windows devices available from Microsoft of Redmond, Washington. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

In certain embodiments, I/O devices may be formed within or otherwise associated with user's 124 clothing or accessories, including a watch, armband, wristband, necklace, shirt, shoe, or the like. These devices may be configured to capture image data. It is to be understood that they may detect image data based on one or more athletic movements during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114.

In certain embodiments, device 126 shown in FIG. 1, may comprise footwear which may include one or more sensors, including but not limited to those disclosed herein and/or known in the art. ii. Wrist-worn device Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130*a* and 130*b* may be sensors integrated into apparel, such as athletic clothing. Such sensors may be placed at any desired location of the body of user 124. Sensors 130*a/b* may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

II. General Description of Image Capture System According to Examples of Present Disclosure In general, as described above, some aspects of this invention relate to systems and methods for distinguishing between consumer products, such as articles of footwear, apparel, and/or athletic equipment, using base and fine-grained classification methodologies.

Any desired type of consumer product may be captured by a user using an image capturing device, such as a camera, a mobile device, and the like. The system may utilize content, such as images, photographs, video, etc., captured by the user to distinguish between various available products and identify, in real-time, the product contained within the captured content. According to aspects of the present disclosure, the system may utilize a variety of details associated with the consumer product (e.g., an article of footwear) to identify the product, such as: a color of a portion of the article of footwear (e.g., the various upper portions or elements, the various midsole portions or elements, the various outsole portions or elements, etc.); pictorial or other graphical data that may be printed or otherwise provided on the footwear, the picture or graphic orientation, etc.; logo data that may be provided on the shoe (e.g., the footwear manufacturer's logo, a team or group logo, etc.); textual data that may be provided on the shoe, text location, the text size, the text color, the text orientation, the text font, etc. In some instances, the system may distinguish between consume products using information indicating a variety of materials or other characteristics for various portions of the article of footwear, such as different upper material(s); midsole material(s); outsole material(s); upper thickness(es); midsole thickness(es); outsole thickness(es)

While described above in conjunction with classification of articles of footwear, aspects of the present disclosure also may be used for classification of other consumer products, such as articles of apparel, athletic equipment, etc.

In the footwear example, a user may be permitted to capture an image of an article of footwear in a variety of different environments. For example, the user may capture an image of an article of footwear worn by another person walking down the street; the user may capture an image of an article of footwear displayed on an advertisement, such as a billboard, a television commercial, an on-line advertisement, etc.; or the user may capture an image of an article of footwear in a retail environment, such as at a mall or a retail store. The visual image of the footwear may be stored on the user's device and/or may be stored at a remote location, such as a remote server. In some examples, the user may view the captured image in a user interface provided by a software application for classifying one or more item (e.g., consumer products) within the image. The software application may be executed on the user's device and/or may be executed on a remote computing device. The user interface may provide one or more visual, audible, or textual indications (e.g., virtual objects, written instructions, voice command, on-screen icons, etc.) on how to capture images of an object using the interface.

In some instances, users may use computing devices to access the remote application. The computing devices establish a communication channel within a network and communicate with a server system (comprising one or more server computers) that provide product classification features used to detect and classify particular consumer products. Any desired communication link and communication protocol may be used to provide and control the data exchange between computing devices and the system. Users may use a computing device to connect to the online classification system via a network, such as the Internet, a local area network (LAN), a wide area network (WAN), or the like. Users may connect their computing devices to the system via any communication channel, such as website portals and applications from various social networking websites that link to the website portal of the manufacturer.

Any desired types of computing devices may be used without departing from aspects of the present disclosure, such as any computing device capable of establishing a networked connection and/or a peer-to-peer connection and capable of providing the necessary display, user interface, and input capabilities, as will be described in more detail below. Some more specific examples of computing devices that may be used in systems and methods in accordance with at least some examples of this invention include, but are not limited to: desktop computers, personal computers, laptop computers, palmtop computers, handheld computers, cellular telephones, any other mobile devices or smartphones, personal digital assistants, computer workstations, televisions, and the like.

Computing devices that may be used in systems and methods in accordance with examples of this invention may include one or more input devices and a data processing system (e.g., including one or more microprocessors). Examples of input devices that may be included with the computing devices may include one or more devices illustrated in FIGS. 1 and 2, and are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, the computing devices may have "touch screen" capabilities, such that a user input data into the computing device by physically touching the screen of the display with the user's fingers or a selection device, such as a stylus. Additionally, any desired type of display device may be provided for use in conjunction with the computing devices of systems and methods according to this invention, including display devices integrated with the computing device itself or display devices separate from the computing devices but in communication therewith, such as projector displays, separate monitor displays, etc.

The software for generating the user interface discussed above may reside on computer readable media present on or available to the computing device or server system. In some instances, a user's computing device may transmit image data to the server system for further processing the image data and/or classifying an object associated with the image data. The computing device may determine when to transmit the image data to the server system based on predetermined or dynamic processing thresholds. For example, the computing device may estimate the load on the device's processing system to process the image data and/or to classify an object. The computing device may estimate the load in a variety of ways, including based on the file size of the image data. If the processing load exceeds a processing threshold, the computing device would send the image data to the server system for additional processing. After processing the image data and/or classifying the object, the server system may send data indicating the classified object to the computing device. In some embodiments, the computing device may send the image data to the server system to verify a determination/classification made by the computing device. Alternatively, if desired, the software, or at least some portion(s) thereof, may reside on more than one computing device or server system. The sever system may be operated and maintained by the same organization(s) or individual(s) that operate and maintain the computing device and/or network, or the server system may be operated, controlled, and maintained by a party separate from any or all of these entities. As some more specific examples, the server system may be operated and maintained (and the user interface software also may be operated and maintained) by one or more entities whose products are being classified through the classification systems and methods described below (e.g., a manufacturer, a retailer, a vendor selected by a manufacturer or retailer, etc.).

Image data may be captured from one or more image-capturing devices, such as a camera located on a mobile terminal device, a video camera, a still-image camera, and/or any apparatus configurable to detect wavelengths of energy, including light, magnetic fields, and/or thermal energy. As used herein, "image data" may encompass raw and/or compressed data, either in a physical tangible form or stored on a computer-readable medium as electronic information. Further, a plurality of images may form part of a video. Thus, references to images and/or pictures encompass videos and the like.

In aspects of the present disclosure, image data, such as information obtained while the user is within a retail environment, during the user's performance of physical activity (e.g., participating in a basketball game and/or performing a specific action, while the user is consuming an advertisement relating to a consumer product. For example, a computer-readable medium may comprise computer-executable instructions that, when executed, may perform obtaining a plurality of images (e.g. a video) of an athlete playing a sport. For example, portable electronic device 112 may comprise an application that permits user 124 (or another user) to use an image capturing device (either part of the portable electronic device or provide an input to an external image-capturing device, to capture the image data.

In some aspects of the present disclosure, upon the user activating an image capturing function (which may be a hard or soft button) on a host device (e.g., the portable device 112), the portable device may process the captured image data to determine and classify one or more consumer products therein. In other aspects of the present disclosure, the user may select the captured image data via a software application to initiate the product classification process.

Image data may be obtained in response to a user operating a camera on a device, such as a camera of portable device 112. In certain embodiments, image data may be obtained from a broadcast source not directly controllable by user 124 (and/or individuals or entities under user's 124 direction), such as for example a content source provider. For example, a content source provider may broadcast (either live and/or delayed) a sporting event. In one embodiment, the event may comprise a scheduled basketball game. However in another embodiment, sporting event may comprise an unscheduled event, such as a pickup game.

In some aspects of the present disclosure, image data may only be captured based on sensor data. In one embodiment, sensor data may be physical activity data. For example, in certain implementations, image data may be captured upon determining that the user is participating in a particular activity. As another example, in certain implementations, image data may be captured upon determining that the user has exceeded a threshold performance goal and/or activity performance metric. In another embodiment, at least one physical attribute value must meet a threshold.

As discussed above, sensor data may be received, which may comprise raw and/or processed information relating to the user's 124 activity. Activity data may be obtained from one or more sensors described herein. For example, in one embodiment, the user's footwear may comprise at least one sensor. In certain embodiments, at least a portion of the athletic data may remain on the sensory device or another device operatively connected to the user (e.g., wrist-worn device and/or shoe-mounted sensors). The data may then be joined and/or otherwise associated with the captured image data.

In some aspects of the present disclosure, the system may use deep neural network architecture and deep learning methodologies to process and analyze image data containing one or more consumer products to be classified. Deep learning offers a set of techniques and algorithms that help us to parameterize deep neural network structures—artificial neural networks with many hidden layers and parameters. In some aspects of the present disclosure, the system may utilize machine learning software to process the image data and classify one or more consumer products contained therein. For example, feed-forward networks with hidden layers, and other deep neural networks may be used to classify consumer products contained within the image data. These networks may use the intermediate (hidden) layers to build up multiple layers of abstraction, wherein each layer may be utilized to perform a separate image processing function. For example, when performing visual pattern/product recognition for a particular product e.g., an article of footwear, then the neurons of a first layer might be configured to recognize edges of the footwear, the neurons of a second layer might learn to recognize more complex shapes (e.g., triangles and rectangles), built up from edges. The third layer might learn to recognize still more complex shapes, and so on and so forth. These plurality of layers of abstraction are likely to give deep networks a compelling advantage in learning to solve complex pattern and product recognition problems. Other types of neural networks, such as convolutional neural networks and generative adversarial networks, may be utilized to perform image processing functions without departing from the scope of the present disclosure.

In some aspects of the present disclosure, one or more database of images associated with the various and available consumer products to be classified may be captured and stored. The system may retrieve information from these databases when attempting to classify a product within image data. The system may compare the information retrieved from the databases (e.g., the one or more images associated with consumer products) with information generated by the system indicating a frame/image of an object (e.g., image data of an object captured by a user device). Additionally, in order to properly calibrate the classification system to accurately and appropriately identify products within image data, the system may be trained to identify particular products using information stored within the one or more database of images and/or information submitted from one or more user computing devices. For example, if the system is capable of detecting a first product under a first set of conditions, the system may be subsequently trained to detect the first product under a slightly modified set of conditions. For instance, if the system has determined that a first item within image data corresponds to a particular style/type of footwear (e.g., NIKE Air Force One), the system may be presented with a plurality of images of NIKE Air Force Ones that have been re-sized to various pixel dimensions (e.g., resized larger than original image, resized smaller than original image), in attempt to have the system continuously learn how to identify the particular style/type of footwear within the context of various sizing conditions/environments.

To maintain context of the classification results across machine-learning training trials, a fixed set of verification images may be utilized. In some instances, the fixed set may be rotated or augmented with additional style-colors of the article of footwear. Additionally, in order to best simulate real-world environments, the verification images used to train the classification system may comprise images of the article of footwear in a variety of environments, such as in a shoe box, being held in someone's hands, against backgrounds of varying colors, on a carpeted floor, under various lighting conditions, at various angles of image capture, and the like. Additionally or alternatively, verification images may be obtained from data submitted by a plurality of users over a network.

In some aspects of the present disclosure, a specially-programmed computing device, such as a rotating scanner, may be utilized for capturing a plurality of images of a particular product using one or more image capturing devices. For example, the scanner may be used to collect a plurality of separate images of the product, which may correspond to (and be captured by) one or more different image capturing devices, each capturing one or more images of the product. One or more of the image capturing devices may be mounted at a particular angle as the product rotates upon a platter, thus allowing the image capturing device(s) to capture the product at a plurality of different angles.

The images captured with the rotating scanner may be utilized to develop a verification set of images for assisting the system to learn how to detect and classify a particular consumer product. These verification images can became the basis for a set of images, (e.g., a verification set), which can be used to evaluate various neural networks built to identify particular features of a consumer product. To increase the learning accuracy of the system, additional verification images may be supplied to the system, wherein the additional verification images capture the consumer product in various conditions, such as solid backgrounds, textured backgrounds, different lighting angles and the like. After the system has learned to detect a particular product, e.g., such as by detecting a product within a threshold confidence level (e.g., 85%, 90%, etc.), the system may then be capable of detecting products within image captured by a user's mobile device.

Rather than utilizing set angles and fixed lighting levels across all verification images, which may cause the verification data to be too uniform and homogeneous and cause the system to focus on and thereby apply too much weight to incorrect features of the product, varying the conditions in which the product is captured will more closely reproduce the various conditions in which user's may capture a particular product. In other words, during feature detection performed by the system, repeated elements such as light level, straight line trajectories, extreme close-up shots of laces, etc. may be given more weight. When an image submitted for inference lacks these heavily weighted characteristics the resultant probability reflects the network's confidence at making a correct guess. More generalized and less structured training data assists with the regularization of features that may be common across a variety of environments and conditions. By utilizing training data that mimics "real world" environments and scenarios, captured using a mobile device (e.g., portable device 112), the system is more likely to generate the feature vectors needed for confident inference of images submitted by consumers.

Given that there are an infinite number of angles that a consumer can take a shot from, there can always be some weaknesses in the predicting ability of the system when analyzing an image captured by a consumer. However, by using a verification data set that includes images of a product captured at various angles that are more likely to be submitted by a consumer, the system can establish a rough guideline of specific angles for a user to capture when attempting to classify a particular product. As an example, the best results may be achieved with shots captured using a side profile panning approach, wrapping around the side of the shoe. Additionally, many products can appear identical when viewed from certain angles as their uniquely identifying color features are not clearly visible. As such, the previously mentioned obstacles imposed by lighting can further exacerbate these difficulties when combined with limited feature data conveyed through an image captured at a poor angle. Accordingly, an effort to direct a user behavior may be attempted by guiding the user via visual cues utilizing a user interface of the classification application/software executing on the user's device (or a remote device).

As discussed above, the system may learn to classify and detect particular products using verification data sets comprising images of the product captured at a plurality of different angles. In other aspects of the present disclosure, the verification data sets utilized by the system may comprise images of the product captured in a plurality of different lighting environments. This may be achieved by capturing a plurality of image of the product using several models of LED lights each employing a distinct filter. Colored and textured backgrounds may also assist with the diffusion and refraction of differing wavelengths further allowing for ambiguity to be introduced in the dataset for a specific class. Accordingly, bright lights, back light, dim light, shadows, sunlight, fluorescent, etc. may all provide different lighting scenarios that give off different hues, such that the image capturing device may pick up different information for inclusion in the verification dataset. By collecting training/verification data captured using a variety of lighting and shadows the system may mitigate all of the various scenarios that may not be included in the verification dataset. By introducing seemingly insignificant nuances in intensity and spectrum, the verification data set can teach the system to distinguish between information that is either essential or non-essential when detecting and/or classifying a product.

As noted above, verification images may serve as the basis for a set of images, (e.g., a verification set), which can be used to evaluate various neural networks built to identify particular features of a product. However, the neural networks used to classify input images (e.g., consumer products or other items) may ultimately display inconsistent failure modes during image testing and calibration. Such errors may be caused by a sensitivity of the image capturing system to the various conditions in which images are captured. Such conditions (e.g., lighting, environmental, etc.) may be impossible to control and, to the extent that they may be replicated, it would be virtually impossible and exceedingly onerous to do so over multiple image captures of the same or different products. For example, attempting to capture an image of a white shoe using a black accent and shot under darker light settings would produce a different RGB color value than the same black accent color used on the same shoe shot under brighter light settings. Likewise, attempting to capture an image of a white shoe using a black accent and shot under darker light settings would produce a different RGB than the same black color on another shoe shot under brighter light settings.

To address such issues, the system may develop training data in a manner to prevent lighting and environmental inconsistencies between image captures to reduce the reliability and accuracy of image inputs used to produce verification sets and, further, train neural networks configured to identify particular features of various product. In some aspects of the present disclosure the system may capture a plurality of images or video from multiple image capturing devices under various settings (e.g., lighting, environmental, angle of image capture, etc.). For example, the system may capture three (3) videos from each of a plurality of cameras under three (3) different light/environmental settings. Various different settings may be used to capture the images or videos. For instance, a first setting may be used to capture the images/video that are best for the particular product that is being captured (e.g., the best lighting settings for capture shoes of a particular shape, size, color, etc.). Additionally or alternatively, a setting may be used to capture the images/video that are best for capture a plurality of different products. This setting may be considered neutral and provide a baseline setting for lighting or other conditional environments that may be used across a plurality of different products.

The resulting images and video captured by the plurality of image capturing devices may be processed and stored for later use by the system. For example, the system may use the captured image/video data as an input to training the neural network for training the neural network. Referring to the example below, in the event that each of three different cameras are used to capture a product under there different conditions/settings, the resulting set of 9 images/videos may be used as an expanded data set for training the neural network. Accordingly, in addition to providing more consistency in output, the resulting training data for the neural network would be more robust and provide more graceful failure modes in the event that lighting/condition inconsistencies adversely impact training data provided to the neural network for identifying products, thereby improving the accuracy with which the neural network may classify desired products.

Given this general background and information, more detailed information regarding specific examples of systems, methods, computer-readable media, and user interfaces in accordance with aspects of the present disclosure will be described in more detail below. It should be understood that this more detailed description relates to various specific examples of various embodiments and their features and functionality, and this description should not be construed as limiting any such embodiment.

III. Specific Examples of Image Capture System According to Examples of Present Disclosure Various features of product classification systems, methods, and user interfaces (e.g., generated by a computing device for accepting user input and providing a user with information regarding the product classification) will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with this invention.

In some aspects of the present disclosure, the classification system may include a rules database configured to store one or more rules of operating one or more computing devices within the system to capture image data for a verification data used to train the classification system. For example, the rule database may include a plurality of rules configured to instruct one or more computing devices within the classification system to initiate one or more image capturing devices to capture images of an item within a variety of environment and conditions, as will be described in further detail below and at least with respect to FIGS. 12-14. The rules stored in the database may include a plurality of conditions and parameters for when certain devices should be operated to capture image data for verification sets and how the classification should use such information to facilitate machine learning techniques to identify and learn context of particular items (e.g., consumer products) within image data. By storing, accessing, and modifying the various rules within the database, the classification system can more efficiently detect and classify items within image data submitted by consumers.

In at least some aspects of the present disclosure, a classification session may be launched or initiated from a software application that is executed on and/or accessed by a user's computing device (e.g., portable device 112).

User input may be accepted in such systems and user interfaces, e.g., through a mouse, trackball, keyboard, rollerball, touch screen, stylus, joystick, etc., and a user may be allowed to interact with the interface and make selections using a selection device. In some instances, the user may be able to capture image data, e.g., photos, video, etc., via the user interface of the classification application. If desired, user interfaces may be provided with one or more ways to launch product classification systems and methods. Product classification also may be initiated from a web-site or other on-line experiences without departing from this invention, such as through direct interaction with a dedicated product design website, through a product manufacturer's website, etc.

Figures 3A, 3B:
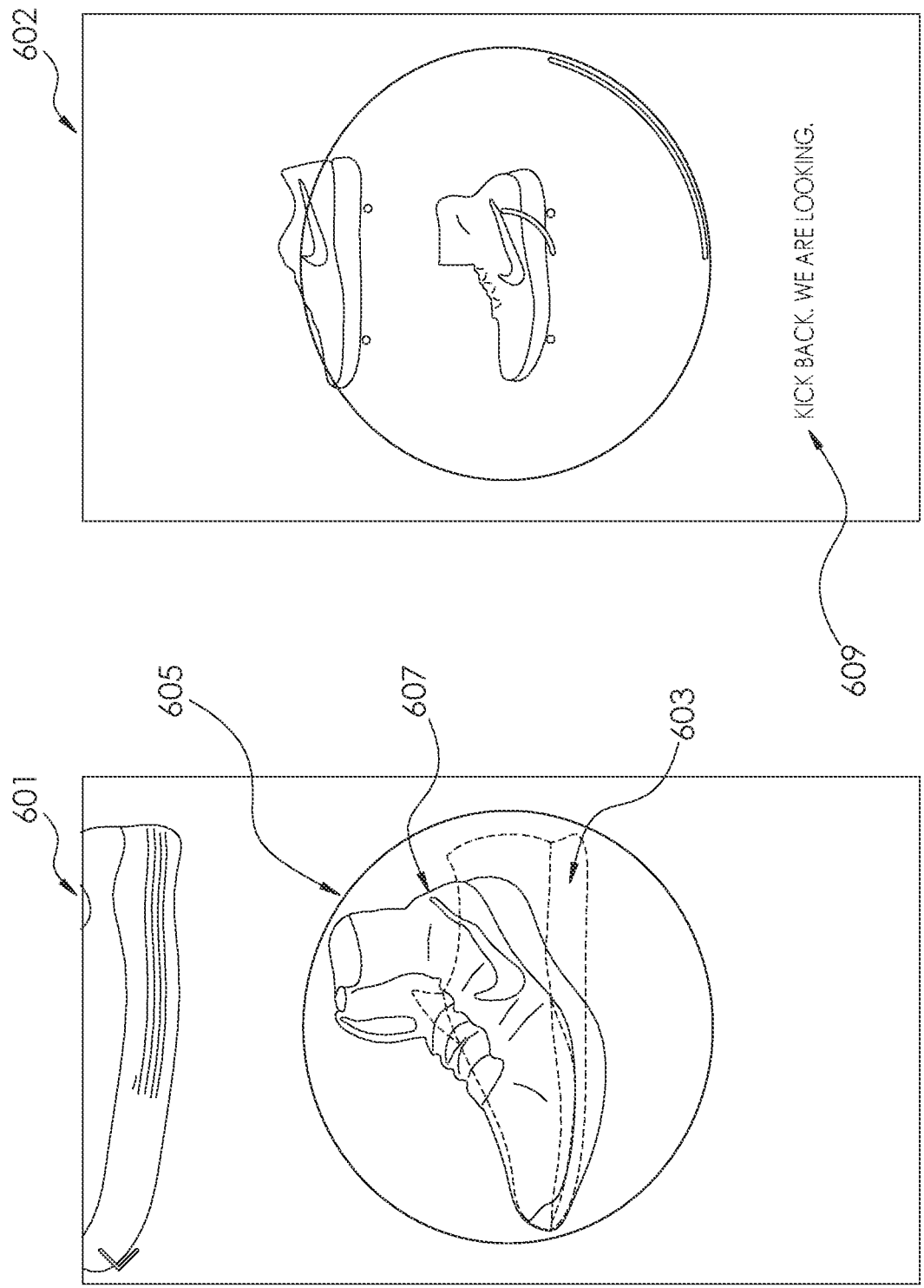
FIGS. 3A and 3B show example user interfaces that may be used to capture images of products in accordance with example embodiments.

FIGS. 3A and 3B show an example of a user interface response that might take place as a result of initiation of a product classification system as described above. As shown in FIG. 3A, the user interface 601 may provide the user with a screen showing images captured by an image capturing device associated with the user's computing device, such as portable device 112. The user interface may include a focus or targeting overlay (e.g., overlay 605) indicating a portion of the user interface that the user should use to capture an image of a desired product. The focus overlay displayed in the user interface may comprise a variety of shapes and/or sizes without departing from the scope of the present disclosure. In some aspects of the present disclosure, the targeting overlay may include a field e.g., field 603, to assist the user in properly capturing an image of the product 607 (e.g., article of footwear). As shown in in FIG. 3B, a portion of the user interface 601 may include text and/or a prompt for communication messages to the user. For example, the user may be prompted to move, rotate, or adjust the focus of the image capturing device to better capture the product. As another example, the user may be prompted to more closely align the item captured by the image capturing device with a field (or outline) displayed on the user interface, so as to assist the user in properly capturing the item within the image data. As yet another example, the user may be prompted via the user interface to capture the image of the product within a target area, such as overlay 605. The user may also be prompted to capture one or more images of the product from various angles using the classification application. In some instances, the user may be prompted to align the product 697 with field outline 603 provided in a display of the user interface.

Figure 4A:
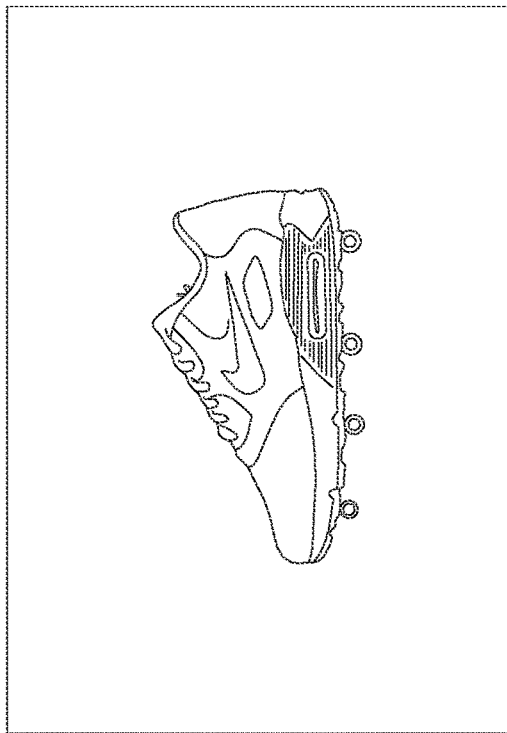
FIGS. 4A-4D shows examples of the communication system cropping image data associated with a captured product in accordance with example embodiments.
Figure 4B:
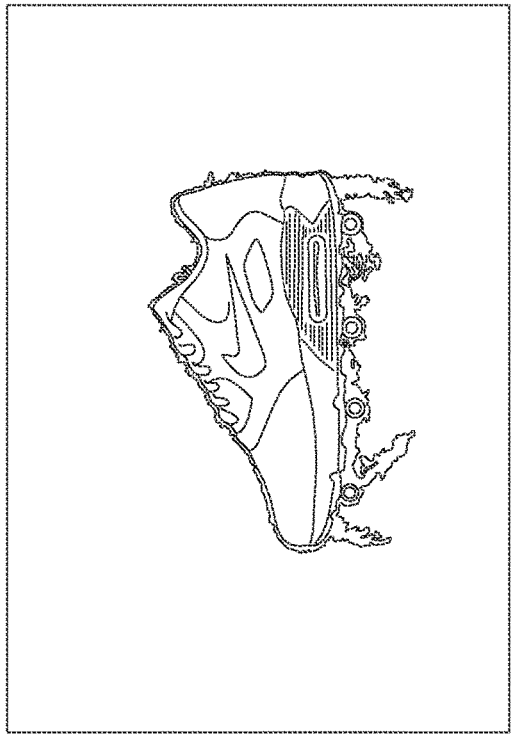
Figure 4C:
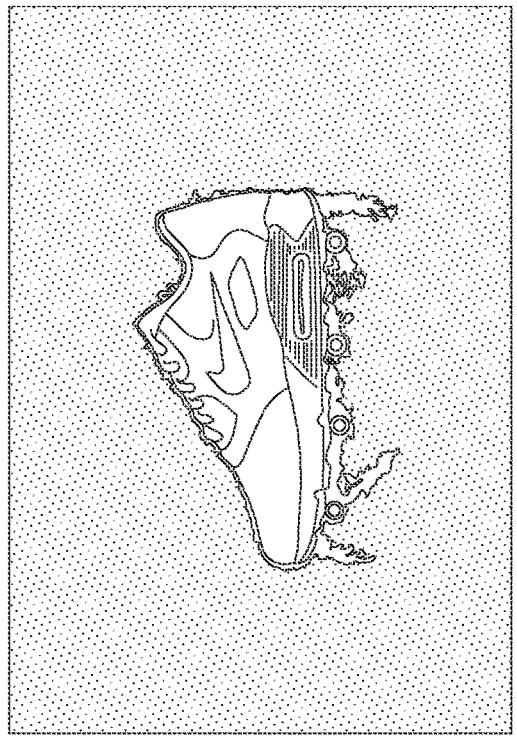
Figure 4D:
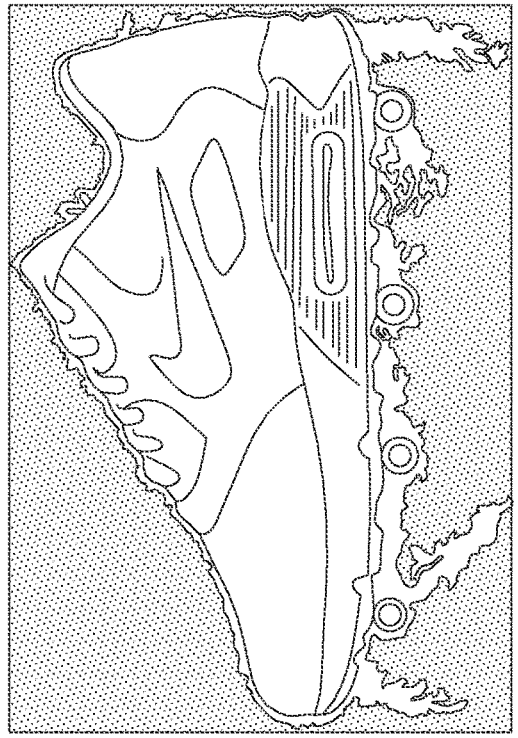

In some aspects of the present disclosure, the classification system may improve the accuracy of the product detection and classification by cropping an image of the product prior to and/or during the processing of image data. By cropping the image data, the application may focus its processing primarily on the detected item. In other aspects of the present disclosure, the classification system may further augment or modify the image data in order to classify a product. For example, as shown in FIGS. 4A-4D, the classification system may isolate an image of the product within image data by cropping out a background to focus processing on the consumer product. As shown in FIGS. 4B, 4C, and 4D, the classification system may utilize contour-based edge detection techniques to detect where to crop the image to the dimensions of the "target" area in order to remove superfluous or background information being transmitted for processing/detection, and further to focus on the consumer product. In still other aspects of the present disclosure, the classification system may utilize a Haar-Cascade classifier trained to detect particular products, such as an article of footwear.

Typically an effort to direct user behavior may be implemented by guiding the user via visual cues utilizing the user interface of the classification application. This has become increasingly easier as more consumers are naturally developing a learned behavior garnered from exposure to various types of detection interfaces. When not utilizing in-application object detection, isolation and cropping, as may be the case in some aspects of the present disclosure, an attempt can be made to guide the user in the capturing of a suitable image for inference and processing by the classification system. In some aspects of the present disclosure, this may include maintaining an appropriate focal distance so relevant and distinguishing features and details are able to be captured while at the same time limiting the introduction of extraneous background detail.

In some aspects of the present disclosure, the classification system may utilize a web-based application to provide the user with a product classification application. In some instances, the web client may be compatible with a browser executed on the user's mobile computing device (e.g., portable device 112) and may allow for submission of one or more images captured using the mobile computing device and/or an image capturing device. The web-client and/or the mobile computing device may resize the transmitted images while maintaining aspect ratio. Upon submission to a remote computing device, the one or more images may be processed through a similar API used by the software application executed on the user' mobile computing device. Results of the classification may be displayed to the user, via a display device, in a standard HTML table.

In still other aspects of the present disclosure, the classification system may utilize client-side processing to detect products within image data. The user's computing device, such as portable device 112, may perform object detection and cropping to isolate products and reduce overall data transfer and processing time. Additionally or alternatively, the use of Haar-Cascade classifiers trained to recognize product shapes may be an ideal solution such that the object of interest could then be tightly cropped from the source image with a high degree of confidence.

In additional aspects of the present disclosure, the classification system may process a continuous stream of images and/or video to perform the product detection/classification. In still other aspects of the present disclosure, the classification system may generate a probability that a detected classification, associated with an image of a product within image data, corresponds to a particular consumer product. The classification system may present the user with one or more potential products that have been identified by the classification system as corresponding to the product within the image data. The classification system may also determine a confidence level for each potential product based on the classification process.

The classification system may also provide the user with a variety of features, via the application interface, for detecting and classifying consumer products.

What Are Those: Nike has made hundreds of thousands of unique footwear models in its history, and currently manufactures several thousand new footwear products and styles per year. The classification system may allow consumers to intuitively identify a consumer products wherever it's seen, powering millions of connections between consumers and the products they own, admire, or affiliate with culturally.

Product Clarity and Purchasing: Whether at wholesale retail sites or in a variety of other environments, the classification system allows a consumer to take an image of a product and make a quick decision about its suitability for their performance and needs, find products that are visually similar to the captured product, and/or (as will be explained in further detail below) the ability to purchase a detected product instantly.

NRC Auto-tagging: Athletes using NRC may identify their footwear (or other products) both by (i) actively "tagging" (and/or associating) the shoe in a drop-down menu via an application interface, or (ii) by simply capturing an image of the product via a photo and sharing that image to a data feed for either or both NRC and an athletic on-line community. The classification system can be employed actively to replace a manual shoe tagging feature in the classification application, or serendipitously when a user posts a photo to the on-line community or social-networking site in which a consumer product is detected and classified by the classification system.

Photo/Media auto-tagging: As a part of a service, the classification system may automatically tag and/or associate a consumer product anywhere the consumer product may be recognized. For example, the classification system may automatically tag a product anywhere a Nike product may be recognized, either within Nike's online collateral (e.g., brand photography, media, etc.); in user generated content appearing within Nike software applications; or within a third-party application (e.g., YouTube, Instagram, Snapchat, Facebook, etc.).

User Submitted Content: The classification system may obtain and collect images captured and/or submitted by users or groups of users. These user's may tag the captured image(s) with product information, style information, and other information associated with the product such that the classification system may confirm the classification and store the image along with the product data in a database for subsequent retrieval.

Match my Outfit: After processing and/or determining a classification for a product, the classification system can provide consumers with color and/or style considerations powered by any combination of data returning from visual search and/or other factors.

Feature Detection & Augmented Reality: Through an additional service, the classification system may also help a consumer identify elements of a product's design, technology, materials and/or branding when using the classification application interface. For example, the system may detect and emphasize product elements to the consumer graphically via the application interface when performing classification and detection techniques. For instance, a Swoosh or Jumpman logo identified by the application interface, within image data captured by the user's computing device (e.g., portable device 112), may activate a graphical representation of the logo via an overlay in the application interface to provide a composite view of the product and the overlay. The classification system may be further configured to overlay other computer-generated images on the product, such as an airbag or bladder over a sole of an image of the detected product; a Lunarlon midsole over a midsole of an image of the detected product; flyknit material over an image of the detected product, and the like based on various types of information associated with the product, for example, metadata associated with the product, style-options and colorways for the product. In some aspects of the present disclosure, the application interface may provide a live direct (or indirect) view of images/video captured by the image capturing device along with computer-generated or extracted real-world sensory input such as sound, video, graphics, and/or position/location information. Thusly, and in addition to identifying a product, a consumer can identify a product's features through augmented reality.

Figure 5:
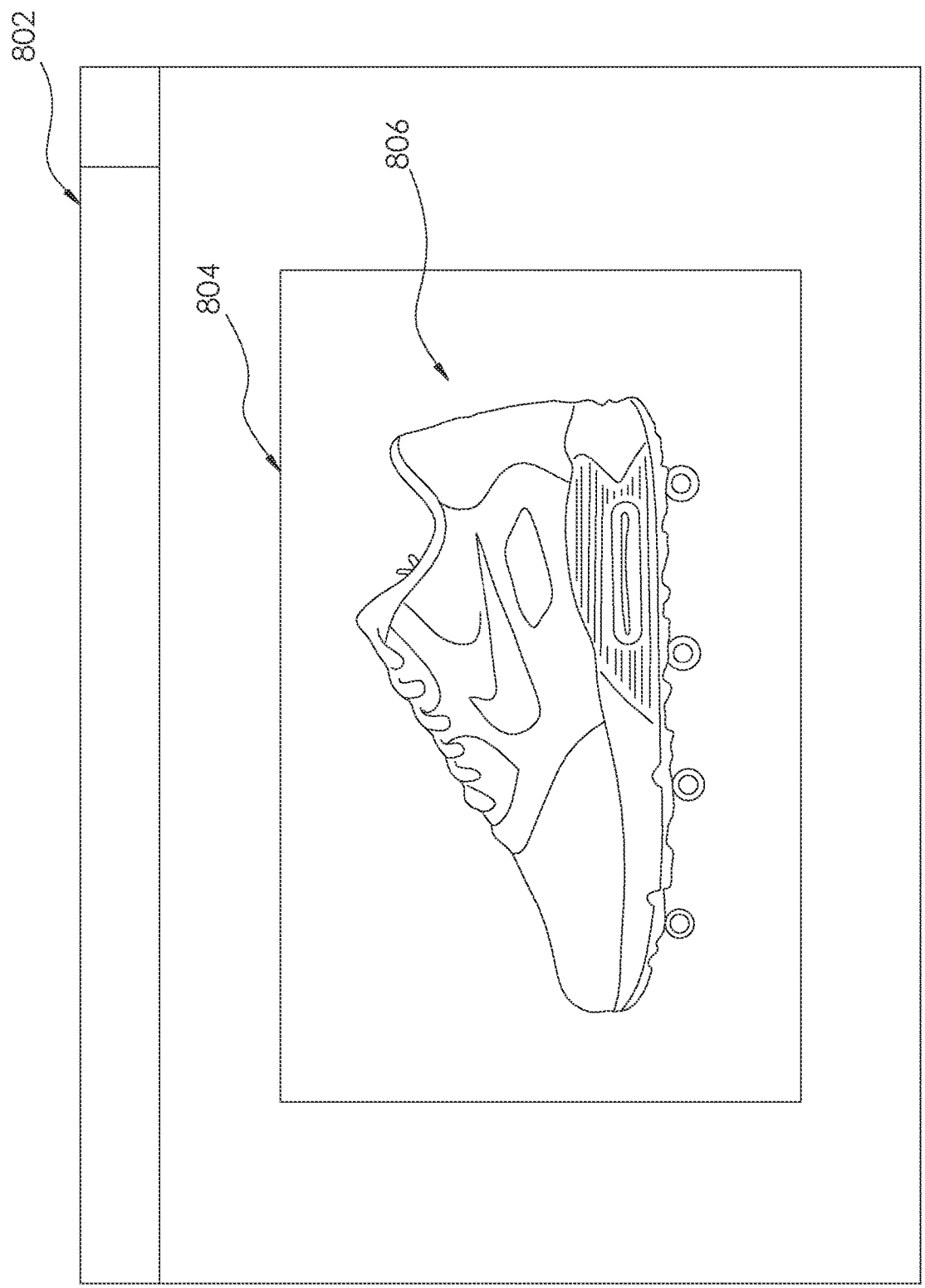
FIG. 5 shows an example of an electronic document and content therein in accordance with example embodiments.

IV. Description of Inventory and Purchase Determinations According to Examples of Present Disclosure FIG. 5 shows an electronic document 802 in accordance with example embodiments of the present disclosure. Example embodiments may make availability determinations about items to be displayed in the electronic document 802 before displaying purchasing links. In an example embodiment, the electronic document 802 may include content 804 displaying one or more items 806. The electronic document 802 may be a webpage or an HTML (or any other markup language) document, for example. In some aspects of the present disclosure, the electronic document may be any electronic media content that are used in an electronic form. The electronic document 802 also may be any data type suitable for presenting information to a user. The content 804 may be a photograph, for example, and/or also may be video. An item 806 may be any product or service available for purchase from a provider. Examples of items that are products may include t-shirts, pants, shoes, hats, food, etc. Examples of services may be lawn care, travel, food delivery, etc. Examples of providers may include merchants, manufacturers, etc. The electronic document 802 may determine whether any of the items 806 are currently in inventory before presenting a purchasing link associated with an item 806, as discussed in further detail below.

In the depicted example, the content 804 is a picture of an item 806 corresponding to an article of footwear. The items 806 may be associated with a field that may or might not be displayed in the content 804.

Figure 6:
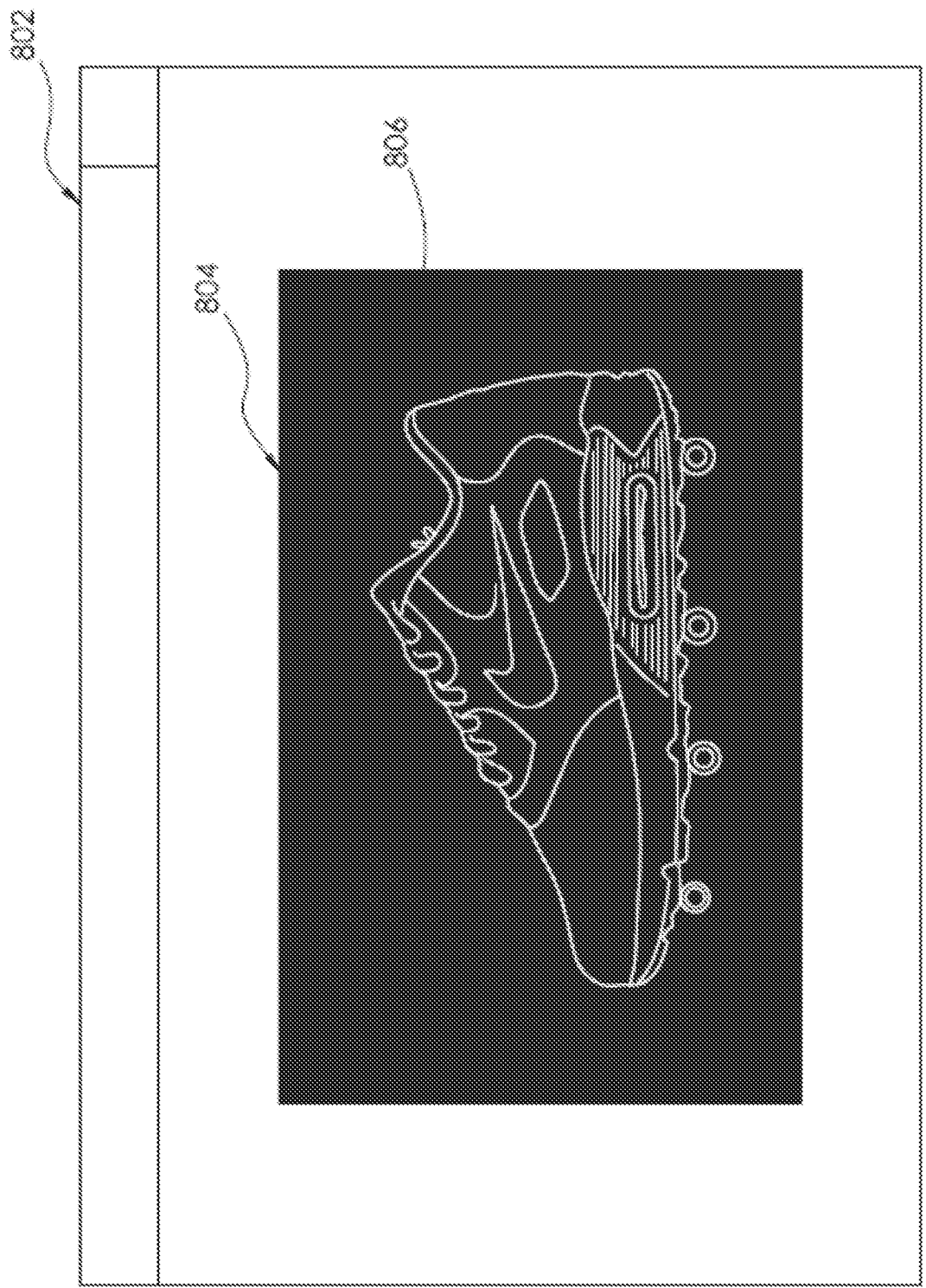
FIG. 6 shows an example of fields associated with the capture of a product therein in accordance with example embodiments.

FIG. 6 shows content 804 including a fields 902 associated with presented item 806 in accordance with example embodiments of the present disclosure. In FIG. 6, the article of footwear have been removed from FIG. 5 to better illustrate the fields 902. The fields 902 may correspond to the location in the content 804 where the item 806 is being displayed. For example, field 902 may correspond to the location in the content 804 where the article of footwear is displayed. Field 902 also may be referred to as a hot spot. The field 902 may be static if the content 804 is a photograph, and the field 902 may adjust to correspond to a current location of an item 806. For example, the content 804 may be video and the footwear depicted in FIG. 5 may move over time. When presenting the electronic document 802, a determination may be made whether an item 806 in the content 804 is available in inventory for purchase. If available, a purchasing link may be displayed permitting a user to purchase the item 806. If unavailable, the purchasing link might not be displayed.

In some aspects of the present disclosure a user may cause an indicator to be positioned relative to an item 806 presented in the content 804. For example, a user input device (not shown), such as, but not limited to, a touch screen display, a computer mouse, a tracking ball, or a key pad may cause an indicator to move about the electronic document 802. The user input device may cause the indicator to hover over an item 806 of interest. If the item 106 is available in inventory for purchase, a purchasing link may be displayed and the user may select the purchasing link to purchase the item 806. The purchasing link may include text instructing the user to select the text to purchase the item (i.e., Select here to purchase this item). A system of determining whether to present the purchasing link is discussed below.

Figure 7:
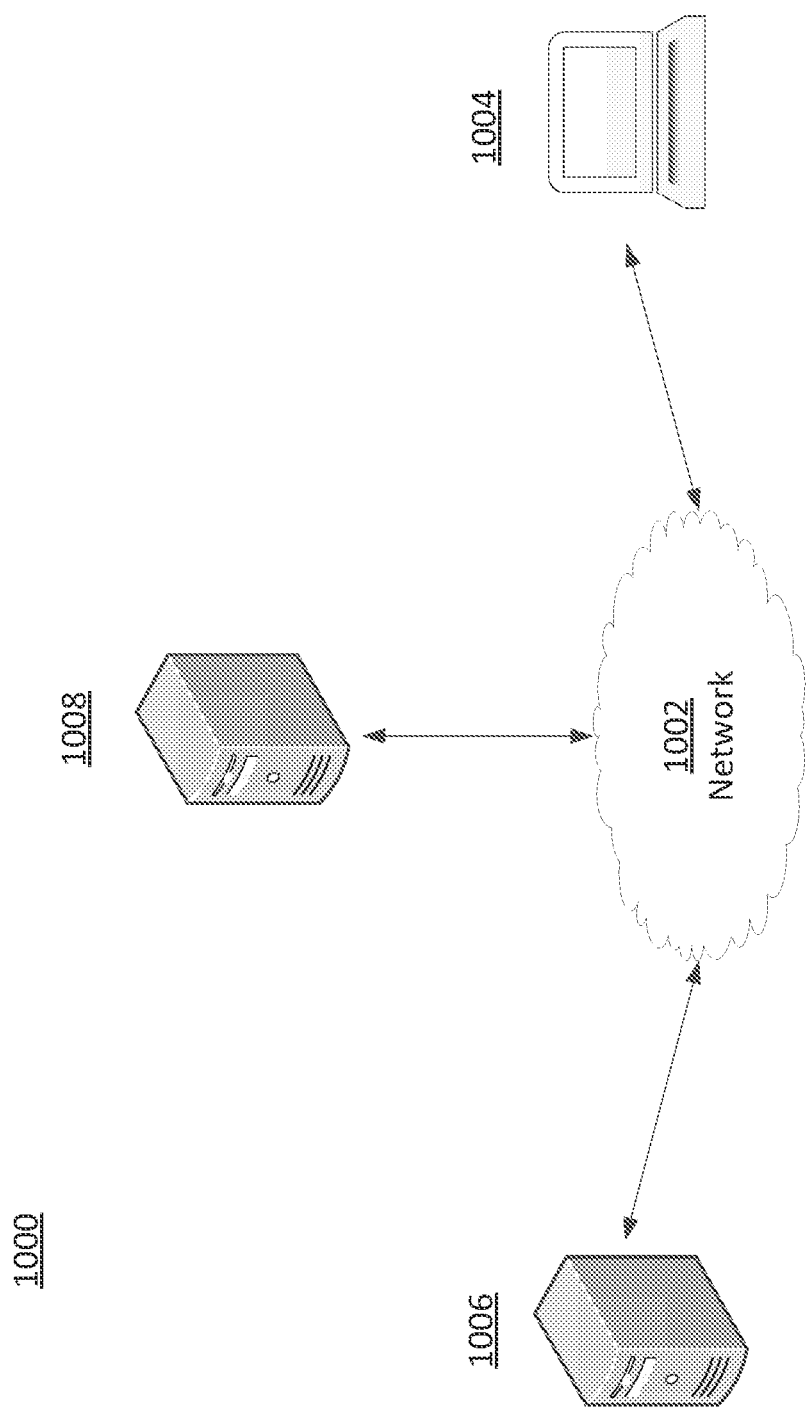
FIG. 7 shows a system in accordance with example embodiments.

FIG. 7 shows a system in accordance with aspects of the present disclosure. The system 1000 may include a network 1002, a user terminal 1004, an inventory server 1006, and a web server 1008. Each of the user terminal 1004, the inventory server 1006, and the web server 1008 may be communicatively coupled to the network 1002. Each of the user terminal 1004, the inventory server 1006, and the web server 1008 may have one or more processors and may have a computer-readable memory storing computer-executable instructions to perform the methods and functions described herein. The memory may be implemented with any combination of read only memory modules or random access memory modules, optionally including both volatile and nonvolatile memory. Also, some or all computer executable instructions may be embodied in hardware or firmware (not shown). Further, the inventory server 1006 and the web server 1008 are depicted as separate devices, but instead may be a single device. The operations, functions, and methods that each of the user terminal 1004, the inventory server 1006, and the web server 1008 perform may be divided across further devices or the various devices may be integrated with one another.

The user terminal 1004 may be a computer, as depicted, but also may be other devices capable of communication with a network, such as, but not limited to, a mobile phone, a personal digital assistant, a set top box, etc. The web server 1008 may store the electronic document 802 and may transmit the electronic document 802 in response to requests from the user terminal 1004. The inventory server 1006 may contain data indicating the availability of items, such as item 806 to be presented in the electronic document 802. Numerous technologies may implement the communication between the user terminal 1004, the web server 1008, and the inventory server 1006 via the network 1002. In an example embodiment, asynchronous JavaScript and Extensible Markup Language (XML), known as (AJAX) may be used. Other protocols also may be used. For example, the electronic document 802 may include one or more stylesheets and the request may for the electronic document 802 may be an AJAX call to the web server 1008.

Initially, the user terminal 1004 may transmit a request for the electronic document 802 to the web server 1008. For example, the user terminal 1004 may include a web browser, and the request may be for an electronic document 802 that is a web page. In addition to requesting the electronic document 802, the request may include a user profile. The user profile may include information about the user of the user terminal 1004, such as, but not limited to, a clothing size. For example, the user terminal 1004 may prompt the user to populate a user profile with information about the user. The user profile may indicate that a user wears shoes that are size ten, and other user preferences that may or may not relate to consumer products. The user profile may be information previously stored or may be entered by the user right before sending the request. Also, the user may have an account with a provider associated with the electronic document 802 and the request may include login information. For example, a footwear company may provide a web page for ordering footwear. The user may register using the web page to obtain an account for storing user profile information and may obtain a user name and password to access the account. In response to the request, the web server 1008 may retrieve the electronic document 802 and may determine that the content 804 of the electronic document 802 includes one or more inventory tags that can be used to instruct the web server 1008 to determine if an item 806 associated with each inventory tag is currently available in inventory for purchase.

Figure 8:
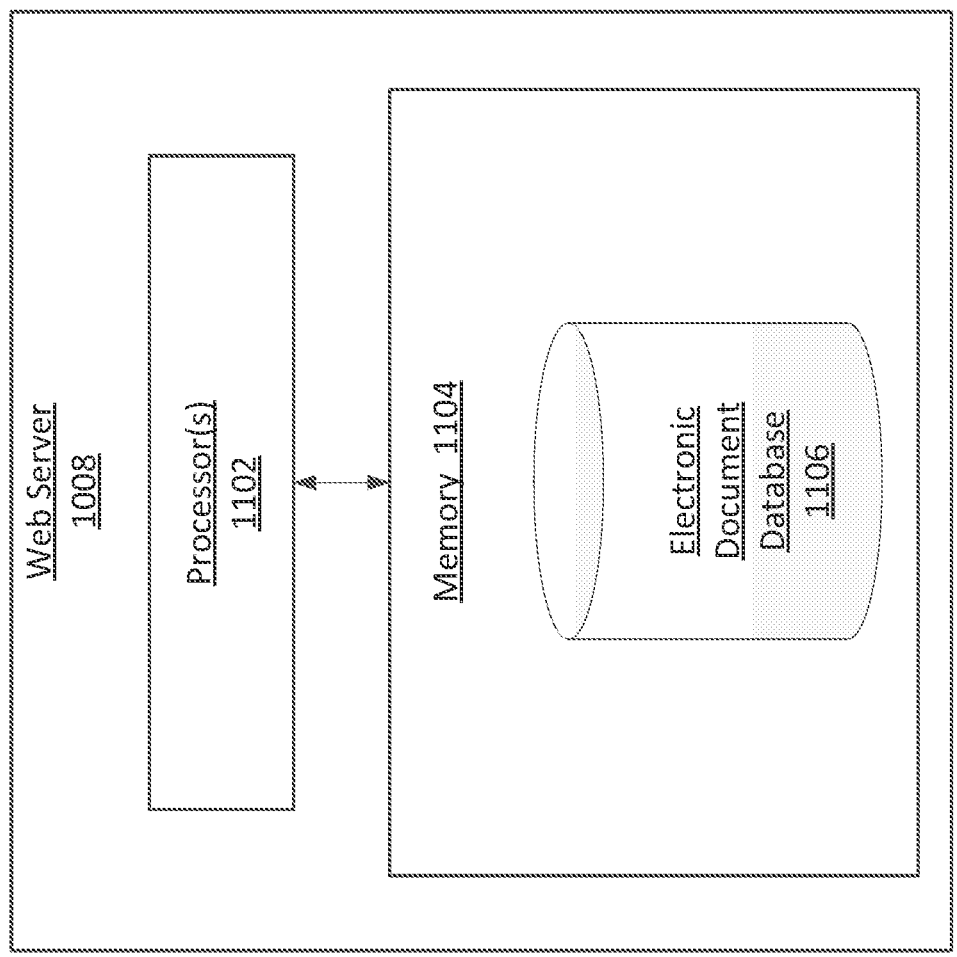
FIG. 8 shows a web server in accordance with example embodiments.

FIG. 8 shows a web server 1008 in accordance with example embodiments of the present disclosure. The web server 1008 may include one or more processors 1102 and a memory 1104. The memory 1104 may store an electronic document database 1106 that may store one or more electronic documents 802. The web server 1008 may receive and process the request from the user terminal 1004 to obtain an electronic document 802 from the electronic document database 1106.

Figure 9:
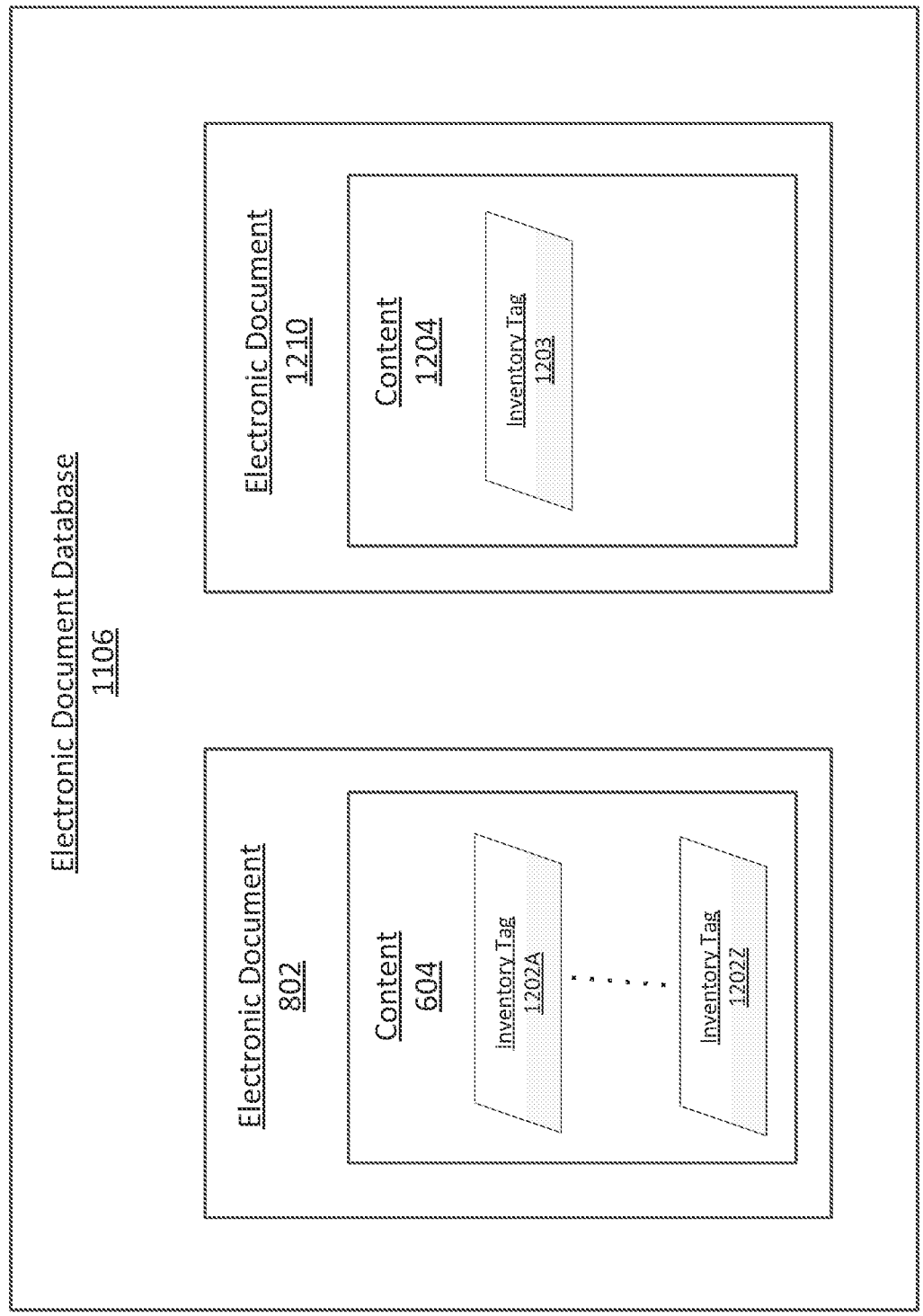
FIG. 9 shows an electronic document database in accordance with example embodiments.

FIG. 9 shows the electronic document database 1106 in accordance with example embodiments of the present disclosure. The electronic document database 1106 may store one or more electronic documents (e.g., documents 802, documents 1210). Each electronic document may include content, which may include one or more inventory tags, such as tags 1202A thru 1202Z. An inventory tag (e.g., tag 1202A) may represent that an item displayed in the content 804 may be available for purchase. In the depicted example, the electronic document database 1106 includes electronic document 802 and 1210. Electronic document 802 includes content 104 and multiple inventory tags (e.g., tags 1202A to 1202Z. Electronic document 1210 includes content 1204 and inventory tag 1203.

An inventory tag 1202 may be an identifier for instructing the web server 1008 to determine the availability of an item, such as an article of footwear, in inventory associated with a related inventory tag before transmitting the electronic document 802 to the user terminal 1004. For example, the inventory tag 1202A may be an instruction and may include a number/letter/symbol sequence to uniquely identify an item, such as item 806. In an example where the item is an article of footwear, each item may be associated with an identifier that is a style number, and the style number may be used to determine availability of that article of footwear. When an inventory tag 1202 is identified in the electronic document 802, the web server 1008 may generate an availability request that includes the inventory tag 1202 and may transmit the availability request to the inventory server 1006 via the network 1002. Also, the inventory server 1006 may periodically provide an inventory feed message to the web server 1008 including the availability information on one or more tags for updating one or more electronic documents 802. The web server 1008 may then examine the inventory feed message to obtain the availability information instead of or in addition to communicating the availability request to the inventory server 1006.

The posting user identifier may identify who posted or uploaded the content 804 in the electronic document 802. For example, a social networking website may provide a computer application for download that permits its members to tag items 806 presented in their content 804. The member may create an electronic document 802 and may upload content 804 displaying an item 806, such as, but not limited to, an article of footwear. The computer application may permit the member to add an inventory tag, or other identifying tags, for each item presented in the uploaded content 804. For example, the user may add a tag indicating that the item is of a particular model, style, color-way, brand, and the like. The computer application may include a drop down menu having styles through which a user may navigate to identify the item 106 displayed in the content 804. The computer application may add an inventory tag to the electronic document 802 that also includes a posting user identifier uniquely identifying the user who posted the content on the social networking website. If a predetermined number of sales (e.g., one or more) result from the content 804 posted by the member, the provider of the item 806 may reward the posting user with an incentive, such as, but not limited to, an affiliate fee or a reward. The incentive may be, for example, a coupon, points, cash, entry in a prize giveaway, merchandise credit, autographs, other incentives, and/ or any combination thereof from sales that result from someone making a purchase after purchasing an item 806 presented in the content 804 posted by the member.

Figure 10:
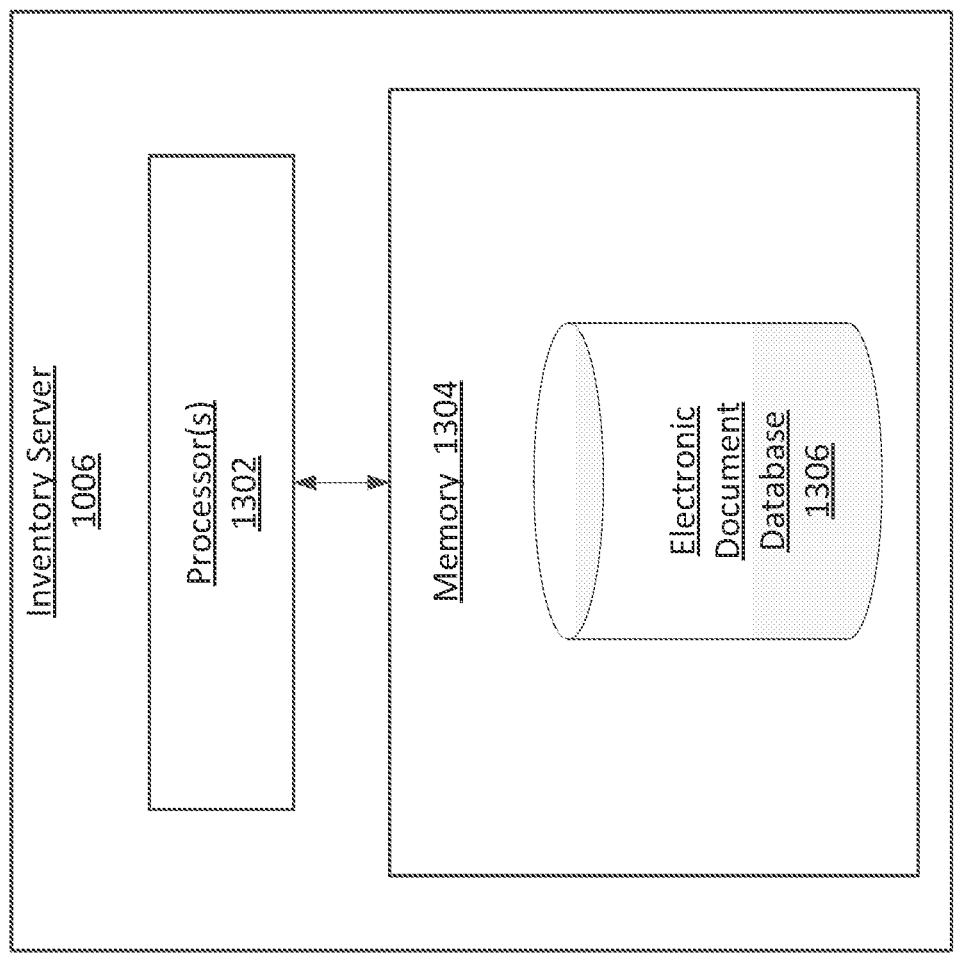
FIG. 10 shows an inventory server in accordance with example embodiments.

FIG. 10 illustrates the inventory server 1006 in accordance with example embodiments of the present disclosure. The inventory server 1006 may include one or more processors 1302 and a memory 1304. The memory 1304 may store an inventory database 1306 that may store information that indicates the availability of one or more items in a provider's inventory. The inventory server 1006 may receive the availability request and may query the inventory database 1306, or other databases, to obtain availability information associated with a particular item and/or inventory tag, such as the inventory tag 1202A.

Figure 11:
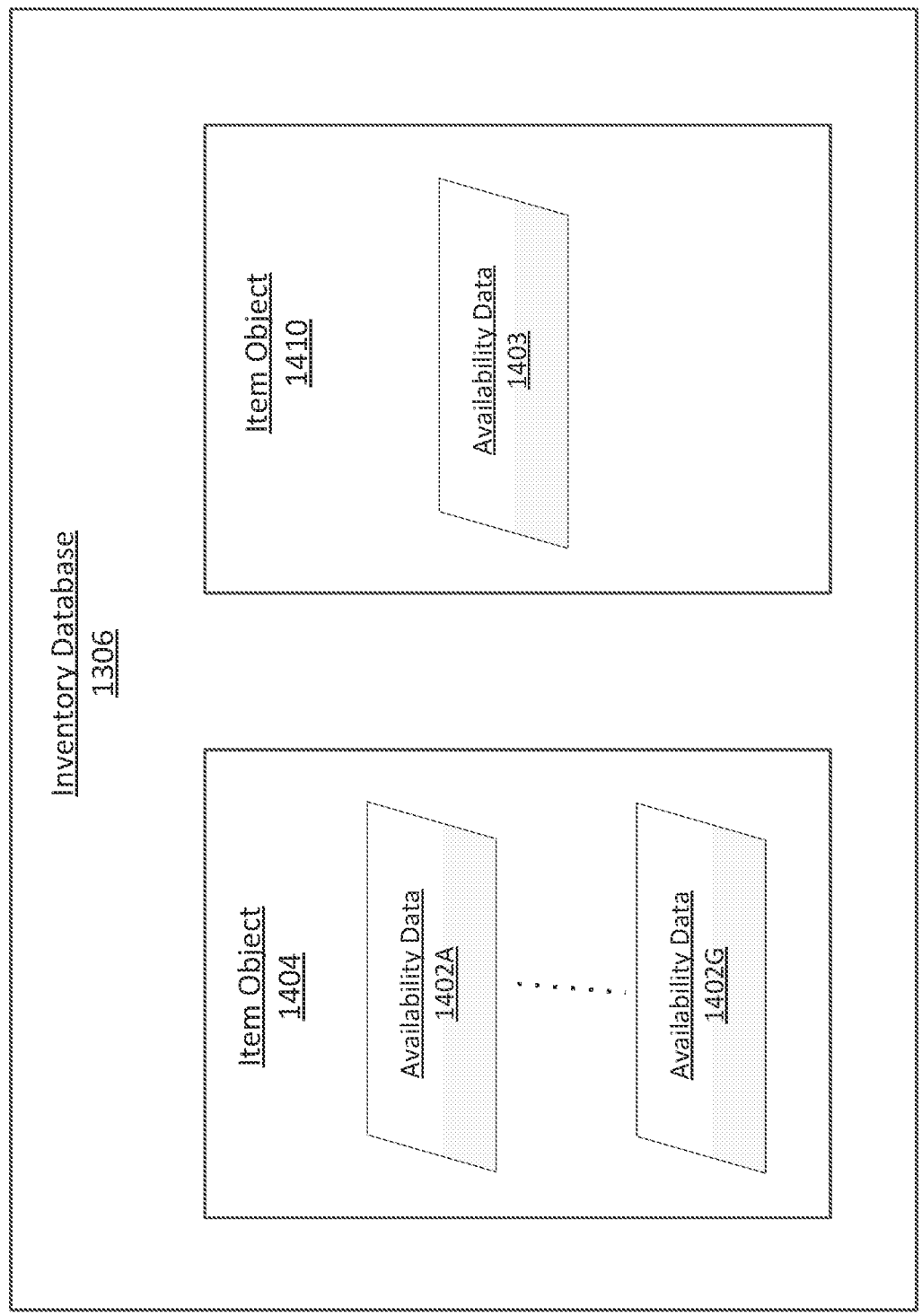
FIG. 11 shows an inventory database in accordance with example embodiments.

FIG. 11 illustrates the inventory database 1206 in accordance with example embodiments of the present disclosure. The inventory database 1206 may include one or more item objects, such as objects 1404 and 1410. An item object 1404 may include information about the availability of an item 806. For instance, an item object 1404 may include availability data 1402A that indicates whether an item is currently in stock. The availability data 1402A may generically indicate that an item is available, and/or also may include further detailed information about the item. For instance, the availability data 1402A may indicate that the item is or is not available, the number currently in inventory, whether any additional items are expected to be received within a time period (e.g., one day, one week, one month, etc.), the availability of particular models or styles, what colors are available, any combination thereof, and so forth. If the item is a shirt, the availability data 1402A may include information at the style level (i.e., whether a particular style is available). The availability data 1402 also may include information about which sizes are currently inventory, the number available in each size, and so forth. In the depicted example, the inventory database 1206 includes item objects 1404 having availability data 1402A-1403G, and item object 1410 having availability data 1404.

The inventory server 1006 may receive and process the availability request having one or more inventory tags to determine whether an item associated with the inventory tags is currently in inventory. The inventory server 1006 may identify an item object (e.g., object 1404) based on an inventory tag. For example, the inventory server 1006 may query the inventory database 1306 based on the identifier of the inventory tag 1202A to identify an item object 1404, and the inventory database 1306 may return availability data 1402A-1402G from the item object 1404. Once retrieved, the inventory server 1006 may generate an inventory response including the availability data associated with one or more inventory tags included in the availability request and may communicate the inventory response to the web server 1008. The web server 1008 may update the electronic document 802 to include corresponding availability information for the item, and may communicate the electronic document 802 to the user terminal 1004 via the network 1002. Also, as mentioned above, the inventory server 1006 may periodically provide an inventory feed message to the web server 1008 including the availability information on one or more tags for updating one or more electronic documents and may or might not include sending the availability request.

The user terminal 1004 may receive the electronic document 802 and may present the electronic document 802 to a user. For example, the user terminal 1004 may include a display and the user terminal 1004 may present the electronic document 802 in a display. The user may manipulate the user terminal 1004 to cause an indicator to be positioned above (i.e., hover) over an item of interest. When the indicator hovers above a field, such as field 902, the user terminal 1004 may process the availability data to determine whether to cause display of a purchasing link. If the availability data indicates that the item associated with the field is in inventory, the user terminal 1004 may cause display of the purchasing link. The user terminal 1004 also may cause display, in real-time, the number of items currently in inventory, whether any items are expected to be received within a certain time period, etc., if included in the availability data. The user may cause the indicator to select the purchasing link to input information to purchase the item of interest. The user terminal 1004 may then interact with the web server 1008 to display images, etc. and process data to complete the purchase. If the availability data indicates that the item is not in inventory, the user terminal 1004 might not display the purchasing link. In some aspects of the present disclosure, the user may be alerted when an item becomes available or is currently in inventory. The user may be further alerted to particular retail stores that may have a desired product in inventory. Also, if unavailable, the user terminal 1004 may present the purchasing link indicating that the item is currently unavailable and may indicate whether the item is expected to be available at some future time. As such, the system 1000 may make determinations about the availability of an item at the time an electronic document is to be presented, and thus may determine, in real-time, whether to present a purchasing link based on current item availability.

IV. Description of Processes and Techniques for Efficient Capture of Image Data According to Examples of Present Disclosure Aspects of innovations disclosed herein further relate to systems and methods for confidently predicting items within content by leveraging machine learning protocols and algorithms. By using improved fine-grained image classification techniques the system may distinguish between objections within a shared base class. Fine-grained image classification concerns the task of distinguishing subordinate categories of some base-classes such as a specific model of car, type of food, type of clothes, model of footwear, and the like. It differs from the base-class classification in that the differences among object classes are more subtle and categories may only be discriminated by local differences, and thus it is more difficult to distinguish them. Variance in the pose, scale, or rotation of an item within captured content typically makes the problem of classifying the item more difficult.

Performing fine-grained classifications can raise challenge when attempting to develop an efficient learning/generalization scheme due to the inevitable dearth of labeled or categorized examples as the grain becomes very fine. Accordingly, aspects of the present disclosure are directed toward solving this challenge by building a learning system that generalizes well in unexplored spaces, and is capable of understanding enough of the base class to efficiently identify differences that separate fine classes, and further to understand the inherent variation allowable within a single fine class. This second capability allows the system to separate previously unseen classes. For instance, a human child may easily classify and remembers faces he/she has never seen before, and is able to instantly add and retain new categories (persons) to memory. In a similar manner, the present system is able to similarly evolve its own categorization schema from entirely unlabeled or uncategorized data.

In order to efficiently capture data of an object in as many scenarios and conditions—be they angle of view, lighting, brightness, focus or motion blur, and the like—with the lowest amount of capture events possible requires a specialized system and process in order to minimize the repetitive, time-insensitive and costly nature of data capture. Image data used for the purpose of training in artificial intelligence and machine learning tasks has conventionally been harvested from the wild, meaning publicly available—user submitted images from social media sites. This process requires manual labeling and tagging of the image assets which is of course time and labor intensive. Additionally, the distribution of required variances in features is not guaranteed due to the intended nature of the source. For example, people posting pictures to an online community or service with the intention of sharing content tend to filter their posts based on the perceived quality of the image. Use of publicly available data for training a classification system also inhibits the ability to identify products within close proximity to the day the product will be released.

As discussed above, conventional processes for obtaining images of products to be used in classification systems entail the outputs that are too uniform in nature in terms of lighting, angle, defects, and the like. Accordingly, the classification results and prediction accuracy of such processes are extremely poor and fall below the results obtained using a manual and therefore unrepeatable process. To achieve the benefits of higher prediction accuracy the classification disclosed herein seeks to customize the image capture process in such a way as to allow for the variances required to improve predication accuracy of the classification system while retaining the automation and repeatability required for a high throughput and more efficient production quality process. Accordingly, the classification system disclosed herein aims to produce images used to identify consumer products in the real-world by allowing for the recognition of a product using an image captured under a variety of conditions and environments, such as angles, lighting, camera settings, and the like. Moreover, the classification system counter-intuitively create as much variation as possible when capturing image data (potentially used as verification data) in an attempt to mimic the types of shots that may be captured and submitted by consumers.

Equipment Set-up and Device Configuration

Figure 13:
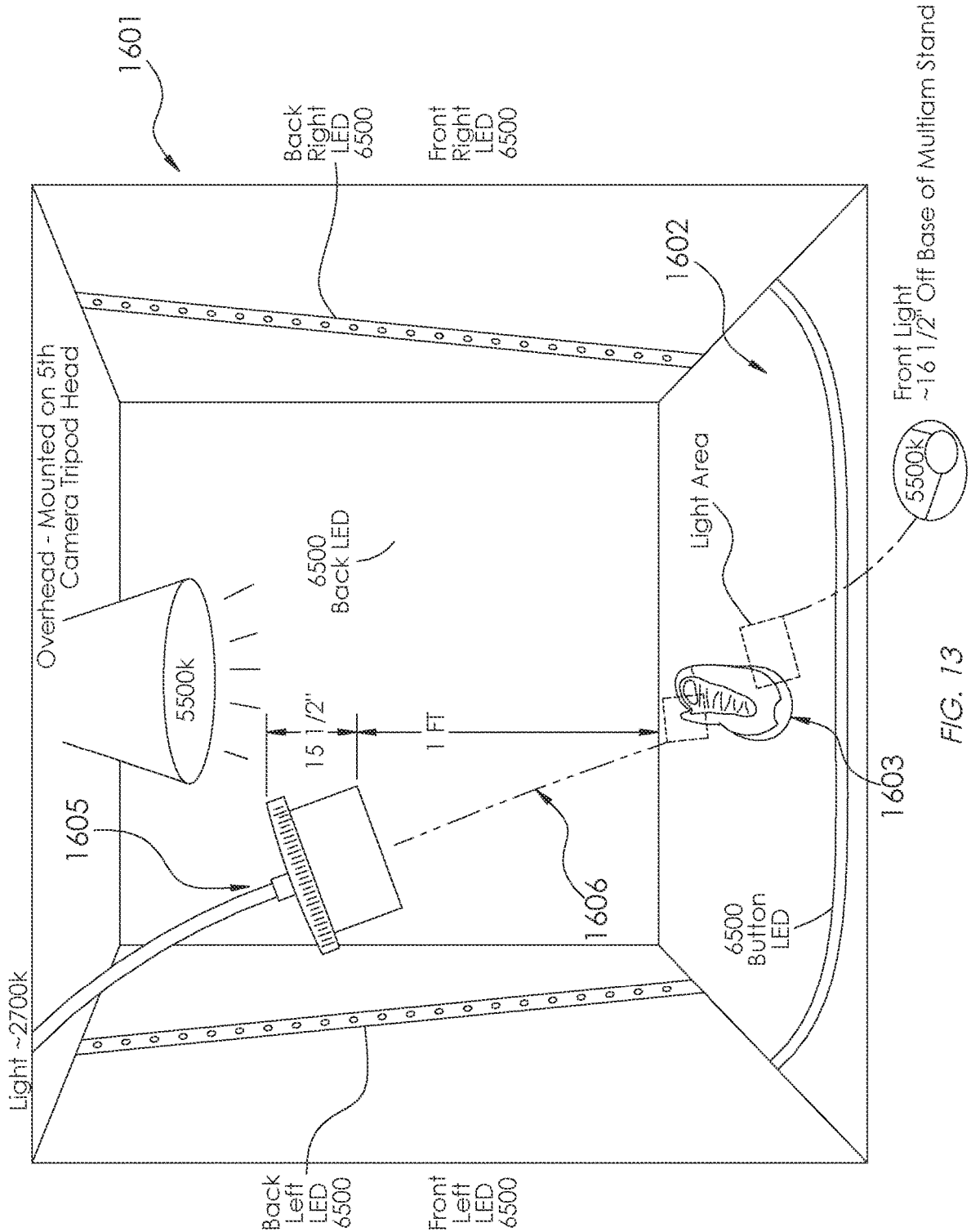
FIG. 13 shows an example image capturing system in accordance with example embodiments.

As shown in FIG. 13, in some aspects of the present disclosure, a lightbox 1601 may be used to immerse an object 1603 (e.g., footwear) in light 1606 emitted from a light source 1605. The light source may comprise a variety of different lighting elements, such as an light emitting diode (LED), without departing from the scope of the present disclosure. One or more light sources may emit light from a variety different locations within the lightbox, such as from the top, bottom, and/or one or more sides of the lightbox, in order to mask the object from the background. In other aspects of the present disclosure, the object may be placed on a platter (e.g., platter 1602) that is motorized to rotate a predetermined number of degrees. In some embodiments, the platter may comprise a glass opaque platter. In other embodiments, the platter may comprise any other suitable material for capturing images of the product within the light box while causing minimal interference with the processing of the object within image data. In some embodiments, the platter may be programmatically configured to rotate exactly 360 degrees. This may ensure the repeatability to the degree at which the object is recorded (and/or captured by an image capturing device) while in motion on the platter.

As described above, the classification system may comprise one or more rules databases that include rules, parameters, and conditions for determining how and/or when to operate the various devices to capture verification data to facilitate the machine learning techniques used to classify an detect items. For example, the classification system may consult the rules data base to determine the how and to what extent the platter should be rotated when capturing images of the item. As another example, the classification system may consult the rules data base to determine which image capturing devices to operate when capturing images of the item, to determine which light sources should be utilized (and/or the intensity of each light source) in order to appropriately modify environmental conditions when capturing image data of the object. By consulting the rules data base, the classification system may efficiently capture verification data utilized along with machine learning techniques to improve the classification and detection capabilities of the system, while also reducing the number of images needed to be taken (or manually taken) to perform such object detection/classifications.

Figure 12:
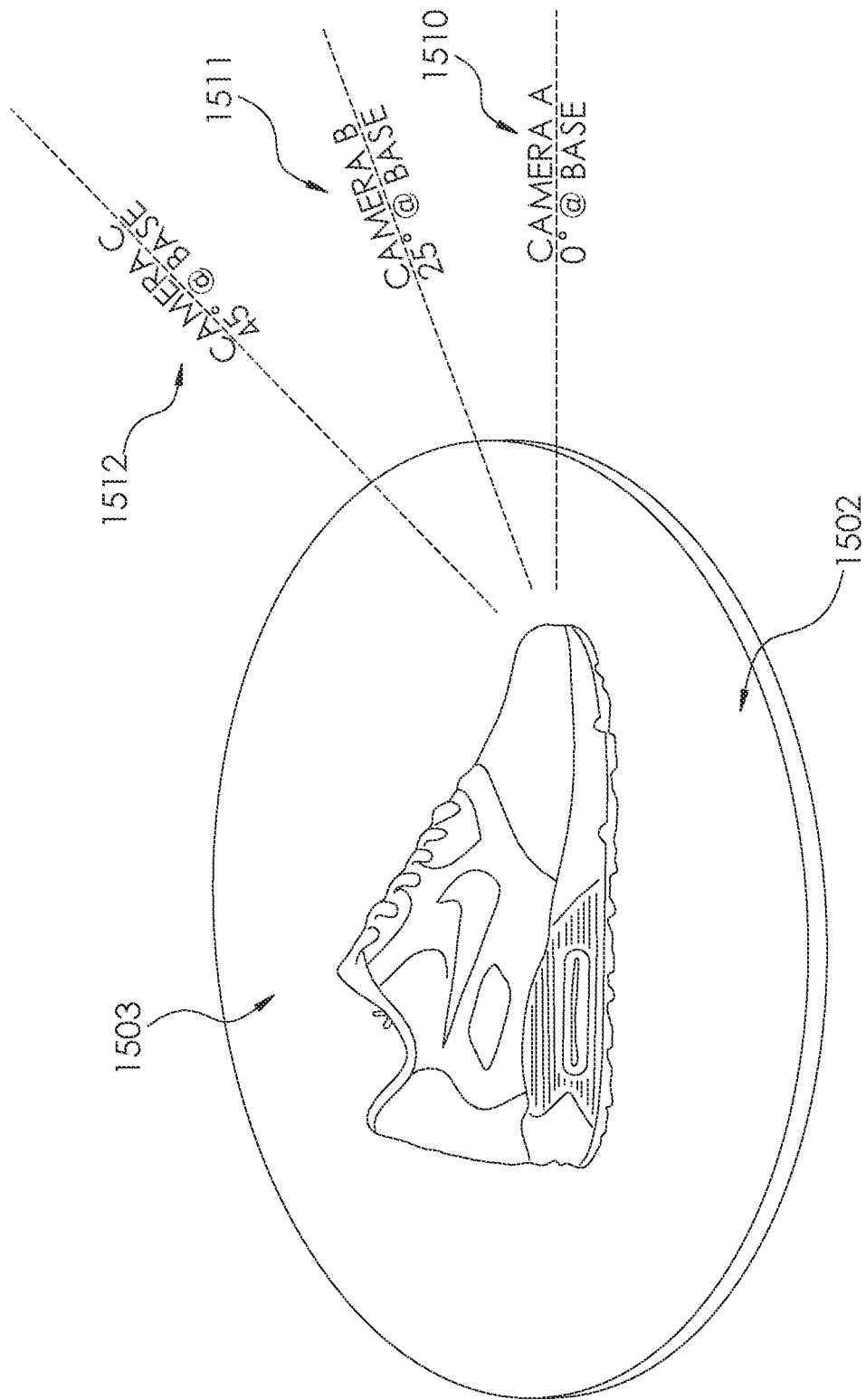
FIG. 12 shows an example image capturing system in accordance with example embodiments.

As shown in FIG. 12, one or more image capturing devices (e.g., devices 1510-1512) may record the object at a plurality of heights and/or angles. In some aspects of the present disclosure, the various angles of the image capturing device may be determined by setting the object (e.g., object 1503) in the center of the platter (e.g., platter 1502) and then tilting a capture device in a manner (e.g., north, south, east, west, etc.) to set the object in the very center of the lens of the capture device. By adjusting a tilt of a capture device, this may eliminate potential barrel distortion caused by the lenses the may otherwise distort the object being captured. In other aspects of the present disclosure, a multi-tiered stand with arms may hold the one or more image capturing devices in place to capture images of the objection. In some embodiments, the image capturing devices may be aligned along on a vertically centered axis. The plurality of image capturing devices may be spaced within a pre-determined proximity from one another at different angles. For example, referring to FIG. 12, each image capturing device may be vertically lined-up 10 inches apart, at three different angles, and pointed towards the center of the rotating platter 1502 where the object 1503 may be placed. In some aspects of the present disclosure, the image capturing devices may be attached to the multi-tiered arm on a tripod head. In some embodiments, the tripod head may be attached to a horizontal base plate with a fixed pan position. In some instances, the base plate may be configured to move on a north-south tilt to compensate for any variance in the height of the object being recorded by the image capturing devices.

Referring back to FIG. 13, in still other aspects of the present disclosure, the object (e.g., consumer product) may be placed on the rotating platter 1602. As the object rotates on the plater, for example in a clockwise manner for a full 360 rotation, the object may be captured by the one or more image capturing devices. In some aspects of the present disclosure, one or more image capturing devices may record the object in a certain color space. In other aspects of the present disclosure, one or more image capturing devices may record the object at a certain frame rate. The image data captured by the one or more image capturing devices may be stored in memory and/or exported as a video or image file to a remote computing device.

In further aspects of the present disclosure, as the object rotates on platter 1602, the object may pass through a plurality of light fields. Each light field may be designed to influence one or more image characteristics of the object, such as the color, texture, specularity, saturation and tone of the object.

One or more of the image capturing devices may have variable settings in order to collect a dynamic range of the objects being recorded. The image capturing devices may be offset from the ideal exposure of the object, such as +/−1 stop of exposure. This is important because as the brightness of the object increases the overall saturation quality of the recorded color may decrease. Along the same lines, the darker the brightness of an image is the overall saturation of the recorded color may increases in value. In some aspects of the present disclosure, the image capturing devices may utilize a variety of different capture settings to capture various portions of the object. For instance, one or more image capturing devices may be set to focus near the front of the object to allow for optimal depth of field, at variable apertures, in order to capture high, medium and low focus. In addition, contrary to conventional video applications that may require a fixed shutter speed that is double the frame rate so as to control motion blur, the image capture devices within the system disclosed herein may be targeted and/or configured at variable shutter speeds to promote more and less blur from the rotating objects.

FIG. 14 illustrates an example method for capturing verification data input for machine learning classification techniques according to one embodiment of the disclosure that may be performed by one or more computing devices. When describing the steps of the method below, the term "system" may be used when referring to each component, either singularly or collective, employed at each step of the method. Such usage is merely for ease in discussing the method, and should not be interpreted as limiting the exact embodiment in which the following method may be performed.

At step 1702, the system may determine (and/or detect) a particular object to capture. In some embodiments, the system may be configured to detect that an item has been placed within a device (e.g., lightbox) for purposes capturing images of the object. In some examples, an administrator may identify the particular object that is being captures such that the system may associate (and/or correlate) captured image data with the corresponding object. As noted above, the object may be a plurality of different consumer products or items, such as apparel, footwear, athletic equipment, and the like.

At step 1704 the system may obtain rules for capturing images of the object detected during step 1702. For example, the system may query a database of rules to determine one or more conditions for capturing images of the object. The rules may indicate one or more conditions and/or parameters for operating various devices in the system in order to achieve particular environments and/or image characteristics for capturing images of the object. At step 1706, the system may determine particular image capturing conditions for capturing images of the object. In some aspects of the present disclosure, the system may determine one or more image capturing conditions based on one or more rules obtained during step 1704. At step 1707, the system may capture image data associated with the object using one or more capturing devices.

At step 1708 the system may extract frames from the captured images of the object. As explained above, the object may be captured at step 1707 using one or more image capturing device to produce image data corresponding to the object. During step 1708, the system may select one or more frames of the image data (e.g., the captured images-including video-of the object). The system may select the one or more frames of the image data based on the timing of the path taken by an image capturing device when capturing the one or more images of the object during step 1708. For example, an image capture device may be moved along a first path to capture various angles of the object as the object rotates on a platter (e.g., via a rotating scanner). Data relating to the timing and positional movements of both the image capturing device and/or the object may be stored for later retrieval and used by the system to determine the one or more frames to select during step 1708. In some instances, the image capturing device may be stationary as the object rotates on the platter. In still other aspects of the disclosure, the system may take as input example images of the object being worn or utilized by consumers to determine the various images, positions, and angles in which the object would likely be captured by the system in future iterations.

The selected frame(s) form the basis of one component of the training data used in the neural network classification process. As explained above, because the neural network classifier may be sensitive to small variations in angle (or other conditions), the system is configured to select frames that correspond precisely to the angles with which to train the neural network. Accordingly, the system may select one or more frames of the image data based on various inputs or parameters indicating predetermined use cases in which the object is likely to be captured. In other words, frames may be selected to mimic or replicate the likely images that would be produced by a consumer that opts to have image of the object captured, for example, a user trying on footwear in a retail store and have the footwear captured by an image device as they stand in a particular area or pose. As another example, in some use cases, the end user may be prevented from capturing images of the product that do not correspond to predetermined angles. For example, the system may prevent of constrain the end user to capturing one or more side profile images of the object, thereby allowing the system and image capturing device to get, in the captured image(s), more identifying information of the product.

Accordingly, the classification system may be trained based on a variety of predetermined use cases to increase the accuracy of classification. Referring to the use case above relating to profile images of the object, to get an optimal accuracy for this use case, during step 1708, the system may be configured to extract one or more frames of the image data corresponding to the object being captured at or near a side profile. For example, the system may select one or more frames corresponding to the object being captured at a side profile, which may set as or correspond a set angle. Additionally, or alternatively, the system may select one or more frames corresponding to the object being rotated a predetermined number of degrees (in either rotational direction) from the base angle, which in this example corresponds to the side profile of the object. This allows the system to obtain and analyze a sufficient variation of frames to account for how each image of the object is taken, particularly since end users may not give perfect side profiles of the object when attempting to capture an image, and the angle of the image capturing device camera may vary slightly for each image of the object that is captured. In other use cases, less constraints may be placed on the end user, thereby requiring that the system be configured to extract a wider variations of frames at different angles. In some instances, the system may obtain 360 degree images of the object.

As explained above, in order to create the final training data to provide to a neural network, during step 1708, one or more frames are extracted by the system from the image data captured during step 1707. One or more of the extracted frames, where each frame may correspond to a single image. At step 1709 the system may modify the image data produced during step 1708 to remove a background image(s) and other data. For example, the system may extract background data from a single image corresponding to a frame extracted during step 1708. To accomplish the extraction of background information from the image corresponding to a selected frame, the system may identify an outline of the object at the pixel level (e.g., pixel boundary), and then determine the areas of the image (corresponding to a selected frame) that are likely to contain the object. In some embodiments, the system may employ and train a neural network (e.g., "Mask R-CNN") to perform these determinations. In other embodiments, the system may use other neural networks to perform instance segmentation and determine pixel boundaries of the object. In some aspects of the present disclosure, the neural network may be implemented using an architecture that is specific to a predetermined use case. Additionally, or alternatively, the network may be implemented using image data that has been manually segmented by having end users or other administrators trace the boundaries of the objects, for example using a drawing application or other suitable software. The resulting data may serve as an input of and basis for training the neural network (e.g., Mask R-CNN).

At step 1710, the system may initiate machine learning algorithms and/or processes using captured image data. The system may run a plurality of trials using various captured image data and/or verification sets to intuitively identify (and/or classify) an object in a variety of environments and conditions, as described above. Over time, the classification system may learn to identify items within image data notwithstanding superfluous image information that may be contained within the image data other than the object itself. Additionally, the system may have the ability to perform fine-classification of the object based on the various training sets processed by the system in association with the item. At step 1712, the classification system may modify and/or adjust object detection and classification parameters based on information obtained through the machine learning training. The modified object detection classification parameters may be used as further input for capturing images of other objects and generating additional image data with which to calibrate the neural network. This allows the system to efficiently capture data of an object in as many scenarios and event conditions as possible with the lowest amount of capture events, thereby minimizing the repetitive nature of data capture sequences. During step 1712, the system may use the modified or adjusted object detection and classification parameters to classify one or more objects within other sets of image data. For example, the system may receive an input image, (e.g., retrieved from a database, captured by a user via a mobile device, etc.), and use the adjusted object detection and classification parameters to classify an object in the input image. The input image may comprise a data file containing a captured image of an object.

In the example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting.

Equipment Set-up and Validation

In order to determine the accuracy of the devices rotational speed, perceived and emitted color temperatures, and angles of light the devices will need to be assessed in three ways for quality assurance. The first is assessing rotational speed of the device; to be by motor speed and data output from the device. A spectrometer and light meter can take the temperature of the emitted lights of the device independently and together to ensure consistent emission. To assess the perception of color reproduced by the capture devices nine videos will be recorded three from each capture device angled at the center of the objects: one a MacBeth color chart, one a 18% grey sphere and one a chrome sphere. Each will be recorded by the capture devices in full 360 rotation from the center of the turntable. These videos can be compared to the CIELAB color scale to determine any shift of color caused by the capture devices, the sensors, the lights, the capture device lenses, or the digitization process of the video. If a shift exists then hardware and software will be tested to bring accuracy back to the videos. These videos will be compared to a control test environment that was recorded previously in order authenticate the perceived color of the capture devices. In some aspects of the present disclosure, the classification system may utilize chrome and grey spheres to capture lighting and other image characteristics associated with a particular environment when capturing images of an item. The system may utilize this information to store and catalog the various environments and conditions in which image data is captured.

The foregoing description was provided with respect to determining whether to present a purchasing link to a user. It is understood that the principles described herein may be extended to similar decisions when presenting other types of information to a user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   modifying, by a computing device, at least one image frame, associated with image data corresponding to an object, to extract background information;
   based on the at least one modified image frame, determining object identification information; and
   using the object identification information to identify the object.

2. The method of claim 1, further comprising:
   receiving, by the computing device, input data indicating product information; and
   associating the product information with the image data corresponding to the object.

3. The method of claim 1, further comprising:
   sending, to a second computing device, the image data corresponding to the object to verify an identification of the object.

4. The method of claim 3, wherein sending the image data further comprises:
   determining that a processing threshold for the computing device has been exceeded; and
   sending, to the second computing device, the image data corresponding to the object.

5. The method of claim 1, wherein using the object identification information to identify the object further comprises:
   determining a product corresponding to the object; and
   determining a confidence level associated with the product and the object.

6. The method of claim 1, further comprising:
   determining one or more products corresponding to the object; and determining inventory data associated with the one or more products corresponding to the object.

7. The method of claim 1, wherein modifying the at least one image frame to extract background information comprises:
using at least a first image frame to determine a pixel boundary of the object.

8. The method of claim 1, further comprising:
extracting the at least one image frame from image data corresponding to the object.

9. The method of claim 1, wherein modifying the at least one image frame to extract background information comprises:
cropping a portion of the at least one image frame associated with image data corresponding to the object.

10. An apparatus comprising:
one or more processors; and
memory storing instructions that, when executed, cause the apparatus to:
modify at least one image frame, associated with image data corresponding to an object, to extract background information;
based on the at least one modified image frame, determine object identification information; and
use the object identification information to identify the object.

11. The apparatus of claim 10, wherein the instructions, when executed, further cause the apparatus to:
receive input data indicating product information; and
associate the product information with the image data corresponding to the object.

12. The apparatus of claim 10, wherein the instructions, when executed, further cause the apparatus to:
determine a product corresponding to the object; and
determine a confidence level associated with the product and the object.

13. The apparatus of claim 10, wherein the instructions, when executed, further cause the apparatus to:
determine one or more products corresponding to the object; and
determine inventory data associated with the one or more products corresponding to the object.

14. The apparatus of claim 10, wherein the instructions, when executed, further cause the apparatus to modify the at least one image frame to extract background information by causing the apparatus to:
use at least a first image frame to determine a pixel boundary of the object.

15. The apparatus of claim 10, wherein the instructions, when executed, further cause the apparatus to:
extract the at least one image frame from image data corresponding to the object.

16. The apparatus of claim 10, wherein the instructions, when executed, further cause the apparatus to modify the at least one image frame to extract background information by causing:
cropping a portion of the at least one image frame associated with image data corresponding to the object.

17. A non-transitory machine readable medium storing instructions that, when executed, cause a computing device to:
modify at least one image frame, associated with image data corresponding to an object, to extract background information;
based on the at least one modified image frame, determine object identification information; and
use the object identification information to identify the object.

18. The non-transitory machine readable medium of claim 17, wherein the instructions, when executed, further cause the computing device to send the image data by:
determining that a processing threshold for the computing device has been exceeded; and
sending, to a second computing device, the image data corresponding to the object.

19. The non-transitory machine readable medium of claim 17, wherein the instructions, when executed, further cause the computing device to:
determine a product corresponding to the object; and
determine a confidence level associated with the product and the object.

20. The non-transitory machine readable medium of claim 17, wherein the instructions, when executed, further cause the computing device to:
determine one or more products corresponding to the object; and
determine inventory data associated with the one or more products corresponding to the object.

21. The non-transitory machine readable medium of claim 17, wherein the instructions, when executed, further cause the computing device to:
extract the at least one image frame from image data corresponding to the object.

22. The non-transitory machine readable medium of claim 17, wherein the instructions, when executed, further cause the computing device to modify the at least one image frame to extract background information by causing:
cropping a portion of the at least one image frame associated with image data corresponding to the object.

* * * * *